United States Patent
Clark et al.

(10) Patent No.: US 8,763,890 B2
(45) Date of Patent: Jul. 1, 2014

(54) PACKAGE HAVING AN ADHESIVE-BASED RECLOSABLE FASTENER AND METHODS THEREFOR

(75) Inventors: Kerri Kim Clark, Morristown, NJ (US); Panagiotis Kinigakis, Roscoe, IL (US); Kenneth C. Pokusa, Darien, IL (US); Paul Anthony Zerfas, Verona, WI (US); Jeffrey James Boyce, Grove City, OH (US); Michael Clingerman, Hilliard, OH (US); Colleen Marie Henry, Dublin, OH (US); David Chris Masterson, Grove City, OH (US); Vincent Daniel McGinniss, Columbus, OH (US)

(73) Assignee: Intercontinental Great Brands LLC, East Hanover, NJ (US)

( * ) Notice: Subject to any disclaimer, the term of this patent is extended or adjusted under 35 U.S.C. 154(b) by 655 days.

(21) Appl. No.: 13/035,470

(22) Filed: Feb. 25, 2011

(65) Prior Publication Data

US 2011/0210163 A1     Sep. 1, 2011

Related U.S. Application Data

(60) Provisional application No. 61/308,540, filed on Feb. 26, 2010, provisional application No. 61/317,592, filed on Mar. 25, 2010, provisional application No. 61/407,406, filed on Oct. 27, 2010, provisional application No. 61/407,409, filed on Oct. 27, 2010.

(51) Int. Cl.
B65D 5/4805     (2006.01)

(52) U.S. Cl.
USPC ............ 229/120.09; 206/813; 229/120.18

(58) Field of Classification Search
USPC .......... 229/120.01, 120.09, 120.011, 120.18, 229/87.07; 206/38, 256, 257, 264, 800, 813
See application file for complete search history.

(56) References Cited

U.S. PATENT DOCUMENTS

| | | | | | |
|---|---|---|---|---|---|
| 1,824,491 | A | * | 9/1931 | Molins | 206/273 |
| 1,883,852 | A | * | 10/1932 | Medoff | 206/449 |
| 1,912,875 | A | * | 6/1933 | Warner | 229/120.09 |
| 2,162,094 | A | * | 6/1939 | Mahone | 229/120.09 |

(Continued)

FOREIGN PATENT DOCUMENTS

| | | |
|---|---|---|
| DE | 4410235 | 9/1995 |
| DE | 20113173 | 11/2001 |

(Continued)

OTHER PUBLICATIONS

Bentley, D.; About Cold Seal Adhesives, Paper, Film and Foil Converter, Jan. 1, 2006, Internet Printout; 4 pgs.

(Continued)

*Primary Examiner* — Gary Elkins
(74) *Attorney, Agent, or Firm* — Fitch, Even, Tabin & Flannery LLP

(57) ABSTRACT

A reclosable package for a plurality of products is described herein. The reclosable package includes an adhesive-based fastener that utilizes a low tack adhesive and pivotably connected first and second compartments, each compartment configured to receive the plurality of products therein. The adhesive-based fastener includes opposing portions of resealable adhesive on interior surfaces of the first and second compartments respectively, so that the interior surfaces can be pivoted together to close the reclosable package.

22 Claims, 9 Drawing Sheets

(56) References Cited

U.S. PATENT DOCUMENTS

| | | | |
|---|---|---|---|
| 2,177,856 A | * | 10/1939 | Bennett .................. 229/182 |
| 2,192,473 A | * | 3/1940 | Huston .................. 206/472 |
| 2,387,790 A | * | 10/1945 | Williamson .................. 206/236 |
| 2,541,258 A | * | 2/1951 | Lane .................. 206/256 |
| 2,778,171 A | | 1/1957 | Taunton |
| 2,873,058 A | * | 2/1959 | Janson .................. 229/120.09 |
| 2,991,001 A | | 7/1961 | Hughes |
| 3,154,239 A | | 10/1964 | Madsen |
| 3,176,900 A | * | 4/1965 | Ciganenko .................. 229/125.19 |
| 3,357,543 A | * | 12/1967 | Taggart .................. 206/747 |
| 3,447,733 A | * | 6/1969 | Nelson et al. .................. 229/120.011 |
| 3,541,599 A | * | 11/1970 | Roberts et al. .................. 206/457 |
| 3,608,707 A | * | 9/1971 | Miller .................. 229/123.1 |
| 3,616,898 A | | 11/1971 | Massie |
| 3,827,625 A | * | 8/1974 | Miller .................. 383/211 |
| 3,879,492 A | | 4/1975 | Bontinick |
| 3,885,977 A | | 5/1975 | Lachman et al. |
| 4,058,645 A | | 11/1977 | Steiner |
| 4,061,820 A | | 12/1977 | Magid et al. |
| 4,082,877 A | | 4/1978 | Shadle |
| 4,210,246 A | | 7/1980 | Kuchenbecker |
| 4,361,237 A | | 11/1982 | Heiremans et al. |
| 4,367,312 A | | 1/1983 | Bontinck et al. |
| 4,399,249 A | | 8/1983 | Bildusas |
| 4,488,647 A | | 12/1984 | Davis |
| 4,512,479 A | | 4/1985 | Hain et al. |
| 4,533,445 A | | 8/1985 | Orio |
| 4,533,509 A | | 8/1985 | Gust et al. |
| 4,556,595 A | | 12/1985 | Ochi |
| 4,572,377 A | | 2/1986 | Beckett |
| 4,576,854 A | | 3/1986 | Kurahashi |
| 4,623,398 A | | 11/1986 | Goodman et al. |
| 4,661,099 A | | 4/1987 | von Bittera |
| 4,676,394 A | | 6/1987 | Hiersteiner |
| 4,696,849 A | | 9/1987 | Mobley et al. |
| 4,709,396 A | | 11/1987 | Voshall et al. |
| 4,709,397 A | | 11/1987 | Voshall et al. |
| 4,728,572 A | | 3/1988 | Davis |
| 4,752,342 A | | 6/1988 | Tatum et al. |
| 4,759,642 A | | 7/1988 | Van Erden et al. |
| 4,771,935 A | | 9/1988 | Hekal |
| 4,785,940 A | | 11/1988 | Wilson |
| 4,786,190 A | | 11/1988 | Van Erden et al. |
| 4,791,024 A | | 12/1988 | Clerici et al. |
| 4,810,523 A | | 3/1989 | Williams et al. |
| 4,810,541 A | | 3/1989 | Newman et al. |
| 4,810,745 A | | 3/1989 | Pike |
| 4,855,077 A | | 8/1989 | Shikinami et al. |
| 4,859,521 A | | 8/1989 | Pike et al. |
| 4,889,884 A | | 12/1989 | Dust |
| 4,898,280 A | | 2/1990 | Runge |
| 4,898,787 A | | 2/1990 | Min et al. |
| 4,902,142 A | | 2/1990 | Lammert et al. |
| 4,902,578 A | | 2/1990 | Kerr, III |
| 4,931,327 A | | 6/1990 | Liu et al. |
| 4,932,534 A | * | 6/1990 | Focke et al. .................. 229/120.011 |
| 4,946,728 A | | 8/1990 | Ikeda et al. |
| 4,970,113 A | | 11/1990 | Yamada |
| 4,982,064 A | | 1/1991 | Hartman et al. |
| 5,062,569 A | | 11/1991 | Hekal |
| 5,064,717 A | | 11/1991 | Suzuki et al. |
| 5,073,457 A | | 12/1991 | Blackwell |
| 5,089,320 A | | 2/1992 | Straus et al. |
| 5,141,789 A | | 8/1992 | Matsuzawa et al. |
| 5,145,737 A | | 9/1992 | Boiron et al. |
| 5,151,318 A | | 9/1992 | Strasilla |
| 5,173,344 A | | 12/1992 | Hughes |
| 5,174,659 A | | 12/1992 | Laske |
| 5,178,268 A | * | 1/1993 | Talley et al. .................. 206/256 |
| 5,200,268 A | | 4/1993 | Hamada |
| 5,234,730 A | | 8/1993 | Lautenschlaeger et al. |
| 5,248,715 A | | 9/1993 | Gray et al. |
| 5,286,781 A | | 2/1994 | Gotoh et al. |
| 5,290,842 A | | 3/1994 | Sasaki et al. |
| 5,308,666 A | | 5/1994 | Borchardt |
| 5,334,643 A | | 8/1994 | Gage |
| 5,352,466 A | | 10/1994 | Delonis |
| 5,382,472 A | | 1/1995 | Yanidis |
| 5,384,341 A | | 1/1995 | Itagaki |
| 5,392,986 A | | 2/1995 | Beer et al. |
| 5,405,896 A | | 4/1995 | Fujiki et al. |
| 5,413,829 A | | 5/1995 | Brown et al. |
| 5,437,911 A | | 8/1995 | Rohrka et al. |
| 5,449,552 A | | 9/1995 | Bochow et al. |
| 5,473,016 A | | 12/1995 | Fujii |
| 5,519,982 A | | 5/1996 | Herber et al. |
| 5,527,576 A | | 6/1996 | Maul et al. |
| 5,538,771 A | | 7/1996 | Nakayama |
| 5,575,747 A | | 11/1996 | Dais et al. |
| 5,616,400 A | | 4/1997 | Zhang |
| 5,619,058 A | | 4/1997 | Kim |
| 5,626,929 A | | 5/1997 | Stevenson |
| 5,634,969 A | | 6/1997 | Cody et al. |
| 5,639,811 A | | 6/1997 | Plamthottam et al. |
| 5,662,265 A | * | 9/1997 | Jensen .................. 229/107 |
| 5,662,983 A | | 9/1997 | Stark |
| 5,691,052 A | | 11/1997 | Jones |
| 5,706,961 A | | 1/1998 | Morano |
| 5,716,698 A | | 2/1998 | Schreck et al. |
| 5,725,312 A | | 3/1998 | May |
| 5,733,652 A | | 3/1998 | Stowman et al. |
| 5,735,454 A | * | 4/1998 | Jensen .................. 229/123.1 |
| 5,739,087 A | | 4/1998 | Dennis |
| 5,747,560 A | | 5/1998 | Christiani et al. |
| 5,773,136 A | | 6/1998 | Alder et al. |
| 5,780,376 A | | 7/1998 | Gonzales et al. |
| 5,792,549 A | | 8/1998 | Wilkie |
| 5,792,812 A | | 8/1998 | Fujiki |
| 5,795,834 A | | 8/1998 | Deeb et al. |
| 5,807,637 A | | 9/1998 | Schumann |
| 5,814,382 A | | 9/1998 | Yannuzzi, Jr. |
| 5,830,547 A | | 11/1998 | MacKenzie et al. |
| 5,863,977 A | | 1/1999 | Fischer |
| 5,871,142 A | * | 2/1999 | Josephson .................. 229/120.09 |
| 5,882,749 A | | 3/1999 | Jones et al. |
| 5,882,789 A | | 3/1999 | Jones et al. |
| 5,912,084 A | | 6/1999 | Hausmann et al. |
| 5,924,795 A | | 7/1999 | Thompson et al. |
| 5,952,420 A | | 9/1999 | Senkus et al. |
| 5,958,531 A | | 9/1999 | Stevenson |
| 5,972,448 A | | 10/1999 | Frisk et al. |
| 5,981,650 A | | 11/1999 | Zhao et al. |
| 5,993,962 A | | 11/1999 | Timm et al. |
| 5,997,968 A | | 12/1999 | Dries et al. |
| 6,006,913 A | | 12/1999 | Ludemann et al. |
| 6,012,844 A | | 1/2000 | Huseman et al. |
| 6,017,623 A | | 1/2000 | Nakanishi |
| 6,022,612 A | | 2/2000 | Wilkie |
| 6,034,163 A | | 3/2000 | Barbee et al. |
| 6,036,765 A | | 3/2000 | Farrow et al. |
| D423,346 S | | 4/2000 | Froehlich et al. |
| 6,084,010 A | | 7/2000 | Baetzold |
| 6,096,387 A | | 8/2000 | Decker |
| 6,099,682 A | | 8/2000 | Krampe |
| 6,117,531 A | | 9/2000 | Schacht |
| 6,129,983 A | | 10/2000 | Schumann |
| 6,172,156 B1 | | 1/2001 | Lindquist et al. |
| 6,184,264 B1 | | 2/2001 | Webster |
| 6,196,716 B1 | | 3/2001 | Geyer |
| 6,199,698 B1 | | 3/2001 | Hetrick et al. |
| 6,200,677 B1 | | 3/2001 | Richardson et al. |
| 6,210,796 B1 | | 4/2001 | Lobert |
| 6,210,826 B1 | | 4/2001 | Dopp et al. |
| 6,238,090 B1 | | 5/2001 | Yuter |
| 6,244,748 B1 | | 6/2001 | Kasai et al. |
| 6,287,658 B1 | | 9/2001 | Cosentino |
| 6,296,961 B1 | | 10/2001 | Moy et al. |
| 6,312,828 B1 | | 11/2001 | Akao |
| 6,318,894 B1 | | 11/2001 | Derenthal |
| 6,331,336 B1 | | 12/2001 | Szonn |
| 6,351,857 B2 | | 3/2002 | Slaon, III et al. |
| 6,355,732 B1 | | 3/2002 | Beer |
| 6,358,576 B1 | | 3/2002 | Adur et al. |
| 6,358,622 B1 | | 3/2002 | Shida et al. |

(56) References Cited

U.S. PATENT DOCUMENTS

| | | |
|---|---|---|
| 6,359,052 B1 | 3/2002 | Trexler, Jr. et al. |
| 6,371,644 B1 | 4/2002 | Forman |
| 6,376,591 B1 | 4/2002 | Lan et al. |
| 6,384,121 B1 | 5/2002 | Barbee et al. |
| 6,388,006 B1 | 5/2002 | Fujita |
| 6,389,651 B2 | 5/2002 | Johnson |
| 6,398,412 B2 | 6/2002 | Wedi et al. |
| 6,417,262 B1 | 7/2002 | Turner et al. |
| 6,423,768 B1 | 7/2002 | Khouri |
| 6,429,235 B1 | 8/2002 | Varlemann |
| 6,436,571 B1 | 8/2002 | Passaniti et al. |
| 6,444,742 B1 | 9/2002 | Rong et al. |
| 6,451,398 B1 | 9/2002 | Sylvester |
| 6,451,426 B2 | 9/2002 | Kong et al. |
| 6,461,044 B1 | 10/2002 | Anderson |
| 6,461,708 B1 | 10/2002 | Dronzek |
| 6,465,543 B1 | 10/2002 | Alexandre et al. |
| 6,467,957 B2 | 10/2002 | Yeager |
| 6,485,826 B1 | 11/2002 | Watanabe et al. |
| 6,486,253 B1 | 11/2002 | Gilmer et al. |
| 6,499,878 B1 | 12/2002 | Dobreski et al. |
| D470,757 S | 2/2003 | Espinel et al. |
| 6,521,678 B1 | 2/2003 | Chaiko |
| 6,521,690 B1 | 2/2003 | Ross et al. |
| 6,524,700 B2 | 2/2003 | Masuda |
| 6,541,098 B2 | 4/2003 | Venkatasanthanam et al. |
| 6,548,587 B1 | 4/2003 | Bagrodia et al. |
| 6,552,114 B2 | 4/2003 | Turner et al. |
| 6,599,622 B1 | 7/2003 | Chu et al. |
| 6,608,134 B1 | 8/2003 | Tobing |
| 6,613,831 B1 | 9/2003 | Bentley |
| 6,624,273 B1 | 9/2003 | Everaerts et al. |
| 6,630,220 B1 | 10/2003 | Veiga |
| 6,632,522 B1 | 10/2003 | Hyde et al. |
| 6,709,759 B2 | 3/2004 | Mueller et al. |
| 6,713,152 B2 | 3/2004 | Chen et al. |
| 6,713,547 B2 | 3/2004 | Barbee et al. |
| 6,723,403 B2 | 4/2004 | Ishii et al. |
| 6,723,407 B2 | 4/2004 | Dollase et al. |
| 6,743,451 B2 | 6/2004 | Rasile et al. |
| 6,767,951 B2 | 7/2004 | Nair et al. |
| 6,770,697 B2 | 8/2004 | Drewniak et al. |
| 6,777,490 B2 | 8/2004 | Mussig |
| 6,787,592 B1 | 9/2004 | Powell et al. |
| 6,815,025 B2 | 11/2004 | Kawamura et al. |
| 6,831,123 B1 | 12/2004 | Chisholm et al. |
| 6,838,508 B2 | 1/2005 | Hsiao et al. |
| 6,841,241 B2 | 1/2005 | Luhmann et al. |
| 6,844,079 B2 | 1/2005 | Holzer et al. |
| 6,849,313 B2 | 2/2005 | Mechelaere et al. |
| 6,852,422 B2 | 2/2005 | Kendall et al. |
| 6,863,646 B2 | 3/2005 | Kinigakis et al. |
| 6,884,207 B2 | 4/2005 | Pokusa |
| 6,896,956 B2 | 5/2005 | Kong |
| 6,913,809 B2 | 7/2005 | Wolak |
| 6,979,379 B2 | 12/2005 | White, II |
| 6,991,375 B2 | 1/2006 | Clune et al. |
| 7,000,825 B2 * | 2/2006 | Alexander et al. ............ 229/407 |
| 7,135,508 B2 | 11/2006 | Chaiko et al. |
| 7,141,293 B2 | 11/2006 | Peiffer et al. |
| 7,157,516 B2 | 1/2007 | Chaiko |
| 7,163,720 B1 | 1/2007 | Dhaler |
| 7,165,888 B2 | 1/2007 | Rodick |
| 7,166,656 B2 | 1/2007 | Majumdar et al. |
| 7,186,452 B2 | 3/2007 | Peiffer et al. |
| 7,189,781 B2 | 3/2007 | Acevedo et al. |
| 7,205,040 B2 | 4/2007 | Peiffer et al. |
| D541,667 S | 5/2007 | Pokusa et al. |
| D541,668 S | 5/2007 | Pokusa et al. |
| D541,669 S | 5/2007 | Pokusa et al. |
| 7,211,306 B2 | 5/2007 | Peiffer et al. |
| 7,267,858 B2 | 9/2007 | Ono et al. |
| 7,329,439 B2 | 2/2008 | Sachdev et al. |
| 7,329,453 B2 | 2/2008 | Peiffer et al. |
| 7,354,635 B2 | 4/2008 | Malfait et al. |
| 7,368,165 B2 | 5/2008 | Sankey et al. |
| 7,368,496 B2 | 5/2008 | Kim et al. |
| 7,371,793 B2 | 5/2008 | Gong et al. |
| 7,393,581 B2 | 7/2008 | Kim et al. |
| 7,396,578 B2 | 7/2008 | Peiffer et al. |
| 7,413,800 B2 | 8/2008 | Wood, Jr. et al. |
| 7,495,051 B2 | 2/2009 | Nelson et al. |
| 7,740,923 B2 | 6/2010 | Exner et al. |
| 7,892,391 B2 | 2/2011 | Kendig et al. |
| 2001/0012557 A1 | 8/2001 | Willham et al. |
| 2001/0019765 A1 | 9/2001 | Kiuchi |
| 2001/0021451 A1 | 9/2001 | Tokunaga et al. |
| 2001/0035593 A1 | 11/2001 | Peiffer et al. |
| 2001/0039302 A1 | 11/2001 | Wustling |
| 2001/0049414 A1 | 12/2001 | Muller et al. |
| 2001/0055679 A1 | 12/2001 | Schumann et al. |
| 2002/0009563 A1 | 1/2002 | Kawamura et al. |
| 2002/0028335 A1 | 3/2002 | Fujiki et al. |
| 2002/0098347 A1 | 7/2002 | Szonn |
| 2002/0114948 A1 | 8/2002 | Schumann |
| 2002/0122977 A1 | 9/2002 | Fujimatsu et al. |
| 2002/0137834 A1 | 9/2002 | Barbee et al. |
| 2002/0160037 A1 | 10/2002 | Ahrens |
| 2002/0165306 A1 | 11/2002 | Gilmer et al. |
| 2002/0193494 A1 | 12/2002 | Gilmer et al. |
| 2003/0013796 A1 | 1/2003 | Turner et al. |
| 2003/0072957 A1 | 4/2003 | Lee et al. |
| 2003/0082370 A1 | 5/2003 | Husemann et al. |
| 2003/0091763 A1 | 5/2003 | Ferri |
| 2003/0096108 A1 | 5/2003 | Mussig et al. |
| 2003/0100656 A1 | 5/2003 | Majumdar et al. |
| 2003/0103690 A1 | 6/2003 | Schneider et al. |
| 2003/0118759 A1 | 6/2003 | Yoshikawa et al. |
| 2003/0138624 A1 | 7/2003 | Burmeister |
| 2003/0144398 A1 | 7/2003 | Cody et al. |
| 2003/0152735 A1 | 8/2003 | Koike |
| 2003/0180530 A1 | 9/2003 | Otten et al. |
| 2003/0209453 A1 | 11/2003 | Herman |
| 2003/0219585 A1 | 11/2003 | Yamanaka et al. |
| 2003/0219612 A1 | 11/2003 | Massey |
| 2003/0235664 A1 | 12/2003 | Merical et al. |
| 2004/0007319 A1 | 1/2004 | Squier et al. |
| 2004/0031798 A1 | 2/2004 | Fox et al. |
| 2004/0038040 A1 | 2/2004 | Schumann |
| 2004/0052993 A1 | 3/2004 | Dawes |
| 2004/0063841 A1 | 4/2004 | Gilmer et al. |
| 2004/0067284 A1 | 4/2004 | Sankey et al. |
| 2004/0067294 A1 | 4/2004 | Pedrick et al. |
| 2004/0081780 A1 | 4/2004 | Goldman |
| 2004/0097630 A1 | 5/2004 | Whitman et al. |
| 2004/0106693 A1 | 6/2004 | Kauffman et al. |
| 2004/0132906 A1 | 7/2004 | Guerin et al. |
| 2004/0142193 A1 | 7/2004 | Husemann et al. |
| 2004/0161178 A1 | 8/2004 | Olechowski |
| 2004/0180197 A1 | 9/2004 | Everaerts et al. |
| 2004/0191438 A1 | 9/2004 | Cosentino et al. |
| 2004/0219336 A1 | 11/2004 | Sano |
| 2005/0019382 A1 | 1/2005 | Kummer |
| 2005/0031233 A1 | 2/2005 | Varanese et al. |
| 2005/0041888 A1 | 2/2005 | Matsuzawa et al. |
| 2005/0042468 A1 | 2/2005 | Peiffer et al. |
| 2005/0063619 A1 | 3/2005 | Kinigakis et al. |
| 2005/0074619 A1 | 4/2005 | Peiffer et al. |
| 2005/0121822 A1 | 6/2005 | Peiffer et al. |
| 2005/0137310 A1 | 6/2005 | Gupta et al. |
| 2005/0150788 A1 * | 7/2005 | Feusner ........................ 206/278 |
| 2005/0170086 A1 | 8/2005 | Tynan |
| 2005/0182186 A1 | 8/2005 | Gielens et al. |
| 2005/0208282 A1 | 9/2005 | Wood, Jr. et al. |
| 2005/0209356 A1 | 9/2005 | Erickson |
| 2005/0217558 A1 | 10/2005 | Fitzer et al. |
| 2005/0249903 A1 | 11/2005 | Kendig et al. |
| 2005/0249906 A1 | 11/2005 | Sankey et al. |
| 2005/0266257 A1 | 12/2005 | Lee et al. |
| 2005/0266582 A1 | 12/2005 | Modlin et al. |
| 2005/0276940 A1 | 12/2005 | Stevenson |
| 2005/0282948 A1 | 12/2005 | Li et al. |
| 2006/0029300 A1 | 2/2006 | Yoder |
| 2006/0046595 A1 | 3/2006 | Imaizumi et al. |

(56) References Cited

U.S. PATENT DOCUMENTS

| | | |
|---|---|---|
| 2006/0062955 A1 | 3/2006 | Liu et al. |
| 2006/0074167 A1 | 4/2006 | Nelson et al. |
| 2006/0094810 A1 | 5/2006 | Kim et al. |
| 2006/0094811 A1 | 5/2006 | Kim et al. |
| 2006/0111499 A1 | 5/2006 | Kim et al. |
| 2006/0121224 A1 | 6/2006 | Kim et al. |
| 2006/0122311 A1 | 6/2006 | Kim et al. |
| 2006/0122312 A1 | 6/2006 | Kim et al. |
| 2006/0128867 A1 | 6/2006 | Marx et al. |
| 2006/0141183 A1 | 6/2006 | Williamson et al. |
| 2006/0141241 A1 | 6/2006 | Carespodi et al. |
| 2006/0172098 A1 | 8/2006 | Stevenson |
| 2006/0173124 A1 | 8/2006 | Paul et al. |
| 2006/0199890 A1 | 9/2006 | Fasulo et al. |
| 2006/0205916 A1 | 9/2006 | Takekoshi et al. |
| 2006/0211804 A1 | 9/2006 | Kim et al. |
| 2006/0222797 A1 | 10/2006 | Bekele |
| 2006/0228057 A1 | 10/2006 | Newrones et al. |
| 2006/0234047 A1 | 10/2006 | Wenninger |
| 2006/0240204 A1 | 10/2006 | Ling et al. |
| 2006/0240209 A1 | 10/2006 | Sano |
| 2006/0257640 A1 | 11/2006 | Schumann |
| 2006/0269707 A1 | 11/2006 | Berbert |
| 2007/0063005 A1* | 3/2007 | Gomes et al. ............ 229/120.09 |
| 2007/0078212 A1 | 4/2007 | Kim et al. |
| 2007/0104395 A1 | 5/2007 | Kinigakis et al. |
| 2007/0116914 A1 | 5/2007 | Koike |
| 2007/0135563 A1 | 6/2007 | Simmons |
| 2007/0158023 A1 | 7/2007 | Miyake |
| 2007/0179254 A1 | 8/2007 | Wang |
| 2007/0196610 A1 | 8/2007 | O'Rourke |
| 2007/0199481 A1 | 8/2007 | Roelofs |
| 2007/0213464 A1 | 9/2007 | Zollner et al. |
| 2007/0267737 A1 | 11/2007 | Chen et al. |
| 2007/0282064 A1 | 12/2007 | Dollase |
| 2008/0081186 A1 | 4/2008 | Ellringmann |
| 2008/0118688 A1 | 5/2008 | Kinigakis et al. |
| 2008/0131636 A1 | 6/2008 | Kinigakis et al. |
| 2008/0151031 A1 | 6/2008 | Kobayashi |
| 2008/0152850 A1 | 6/2008 | Patterson |
| 2008/0159666 A1 | 7/2008 | Exner et al. |
| 2008/0160293 A1 | 7/2008 | Arimitsu et al. |
| 2008/0176980 A1 | 7/2008 | Torkelson et al. |
| 2008/0206417 A1 | 8/2008 | Kirsch et al. |
| 2008/0223007 A1 | 9/2008 | Friebe et al. |
| 2008/0255296 A1 | 10/2008 | Gibbons et al. |
| 2008/0262126 A1 | 10/2008 | Fleischer et al. |
| 2008/0281038 A1 | 11/2008 | Takahashi |
| 2009/0036580 A1 | 2/2009 | Qian et al. |
| 2009/0043024 A1 | 2/2009 | Brunelle et al. |
| 2009/0048398 A1 | 2/2009 | Zollner et al. |
| 2009/0053388 A1 | 2/2009 | Powers |
| 2009/0053445 A1 | 2/2009 | Trent et al. |
| 2009/0061137 A1 | 3/2009 | Konrad et al. |
| 2009/0061138 A1 | 3/2009 | Peiffer et al. |
| 2009/0098327 A1 | 4/2009 | Buchbinder et al. |
| 2009/0098375 A1 | 4/2009 | Voisin et al. |
| 2009/0186220 A1 | 7/2009 | Palasz |
| 2010/0092793 A1 | 4/2010 | Aithani et al. |
| 2010/0178394 A1 | 7/2010 | Exner et al. |
| 2010/0239721 A1 | 9/2010 | Stoppello et al. |
| 2011/0068040 A1 | 3/2011 | Kendig et al. |

FOREIGN PATENT DOCUMENTS

| | | |
|---|---|---|
| DE | 102005013585 | 9/2006 |
| EP | 0290147 | 9/1988 |
| EP | 0338304 | 10/1989 |
| EP | 0340339 A2 | 11/1989 |
| EP | 0411191 A1 | 2/1991 |
| EP | 0427512 A1 | 5/1991 |
| EP | 0427513 A1 | 5/1991 |
| EP | 0439941 | 8/1991 |
| EP | 0516276 | 2/1992 |
| EP | 0512191 A2 | 11/1992 |
| EP | 0537951 A1 | 4/1993 |
| EP | 0539099 | 4/1993 |
| EP | 0542449 A1 | 5/1993 |
| EP | 0546383 A1 | 6/1993 |
| EP | 0602731 A2 | 6/1994 |
| EP | 0684970 | 12/1995 |
| EP | 0772553 | 5/1997 |
| EP | 0802044 | 10/1997 |
| EP | 0806138 A1 | 11/1997 |
| EP | 0848726 | 6/1998 |
| EP | 1010632 | 6/2000 |
| EP | 1010638 | 6/2000 |
| EP | 1080881 | 3/2001 |
| EP | 1144494 | 10/2001 |
| EP | 1164087 | 12/2001 |
| EP | 1177245 | 2/2002 |
| EP | 1232960 | 8/2002 |
| EP | 1281623 | 2/2003 |
| EP | 1288139 | 3/2003 |
| EP | 1344642 | 9/2003 |
| EP | 1356925 | 10/2003 |
| EP | 1460117 | 9/2004 |
| EP | 1475229 | 11/2004 |
| EP | 1496085 | 1/2005 |
| EP | 1529799 | 5/2005 |
| EP | 1591236 | 11/2005 |
| EP | 1642914 | 5/2006 |
| EP | 1676785 | 7/2006 |
| EP | 1714895 | 10/2006 |
| EP | 1733640 | 12/2006 |
| EP | 1739024 | 1/2007 |
| EP | 1767111 A2 | 3/2007 |
| EP | 1785447 | 5/2007 |
| EP | 1842792 A1 | 10/2007 |
| EP | 1905584 | 2/2008 |
| EP | 2042139 A2 | 4/2009 |
| EP | 2045304 A2 | 4/2009 |
| EP | 2090600 | 8/2009 |
| EP | 2319765 | 5/2011 |
| FR | 2769867 | 4/1999 |
| FR | 2783512 | 3/2000 |
| GB | 1423548 | 2/1976 |
| JP | 59018774 | 1/1984 |
| JP | 05221454 | 8/1993 |
| JP | 6072078 | 3/1994 |
| JP | 10146931 | 6/1998 |
| JP | 11035907 | 2/1999 |
| JP | 2000198170 | 7/2000 |
| JP | 2003095285 | 4/2003 |
| JP | 2005041544 | 2/2005 |
| JP | 2005280736 | 10/2005 |
| JP | 2006315385 | 11/2006 |
| RU | 2237689 | 10/2004 |
| RU | 2244668 | 1/2005 |
| WO | 9516743 | 6/1995 |
| WO | 9748554 | 12/1997 |
| WO | 9800471 | 1/1998 |
| WO | 9952972 | 10/1999 |
| WO | 0039200 | 7/2000 |
| WO | 0058167 | 10/2000 |
| WO | 0187566 | 11/2001 |
| WO | 0222729 | 3/2002 |
| WO | 03011961 | 2/2003 |
| WO | 03035391 | 5/2003 |
| WO | 03040199 | 5/2003 |
| WO | 03091020 | 11/2003 |
| WO | 2004080808 | 9/2004 |
| WO | 2005005276 | 1/2005 |
| WO | 2005014406 | 2/2005 |
| WO | 2005040268 | 5/2005 |
| WO | 2005056644 | 6/2005 |
| WO | 2005116132 | 12/2005 |
| WO | 2006009360 | 1/2006 |
| WO | 2006045896 | 5/2006 |
| WO | 2006058952 | 6/2006 |
| WO | 2006071833 | 7/2006 |
| WO | 2006100084 | 9/2006 |
| WO | 2006111177 | 10/2006 |

(56) References Cited

FOREIGN PATENT DOCUMENTS

| WO | 2007009200 | 1/2007 |
|---|---|---|
| WO | 2007012805 | 2/2007 |
| WO | 2007019142 | 2/2007 |
| WO | 2007027423 | 3/2007 |
| WO | 2007090265 | 8/2007 |
| WO | 2007093798 | 8/2007 |
| WO | 2007106671 | 9/2007 |
| WO | 2007115310 | 10/2007 |
| WO | 2007121048 | 10/2007 |
| WO | 2007121049 | 10/2007 |
| WO | 2007123582 | 11/2007 |
| WO | 2007130755 | 11/2007 |
| WO | 2007146390 | 12/2007 |
| WO | 2008043750 | 4/2008 |
| WO | 2008053205 | 5/2008 |
| WO | 2008115693 | 9/2008 |
| WO | 2008127485 | 10/2008 |
| WO | 2010088492 | 8/2010 |
| ZW | 2894 | 5/1994 |

OTHER PUBLICATIONS

Dow Introduces HYPOD Polyolefin Dispersions, Midland, Michigan, Jul. 11, 2007, [online]. Retrieved from the Internet: http://news.dow.com/prodbus/20070711b.htm; 2 pgs.
European Patent Office European Search Report and Written Opinion, dated Jan. 14, 2008; EP Application No. 07115566.7; 9 pgs.
European Patent Office Extended European Search Report and Written Opinion, dated Apr. 4, 2011; EP Application No. 11156091.8; 4 pgs.
European Patent Office Extended European Search Report and Written Opinion, dated Apr. 4, 2011; EP Application No. 11156092.6; 5 pgs.
European Patent Office Extended European Search Report and Written Opinion, dated Apr. 4, 2011; EP Application No. 11156093.4; 5 pgs.
European Patent Office Extended European Search Report, dated Mar. 5, 2007; EP Application No. 06122144.6; 8 pgs.
European Patent Office, Notification of Transmittal of the International Search Report and the Written Opinion of the International Searching Authority for International Application No. PCT/US2009/042998 dated Aug. 6, 2009; 12 pgs.
Kuusipalo, J.; Re-sealing Studies of Cold Seal Latexes for Paper Based Packages; Finnish Paper and Wood Journal Ltd., 2000, vol. 82, No. 3, pp. 189-192.
Notice of Opposition filed by Opponent BASF in the European Patent Office; EP Patent No. 1939106; dated Dec. 8, 2009; 6 pgs.
Notice of Opposition filed by Opponent Cadbury in the European Patent Office; EP Patent No. 1939106; dated Dec. 3, 2009; 5 pgs.
Notice of Opposition filed by Opponent Ritter in the European Patent Office; EP Patent No. 1939106; dated Nov. 26, 2009; 14 pgs.
PCT International Search Report, dated Mar. 25, 2009; PCT/US2009/33677; 3 pgs.
Response to Notice of Opposition, dated Jul. 21, 2010; EP Patent No. 1939106; 12 pgs.
The International Bureau of WIPO, Notification Concerning Transmittal of International Preliminary Report on Patentability (Chapter 1 of the Patent Cooperation Treaty) for International Application No. PCT/US2009/042998 dated Nov. 18, 2010; 7 pgs.

\* cited by examiner

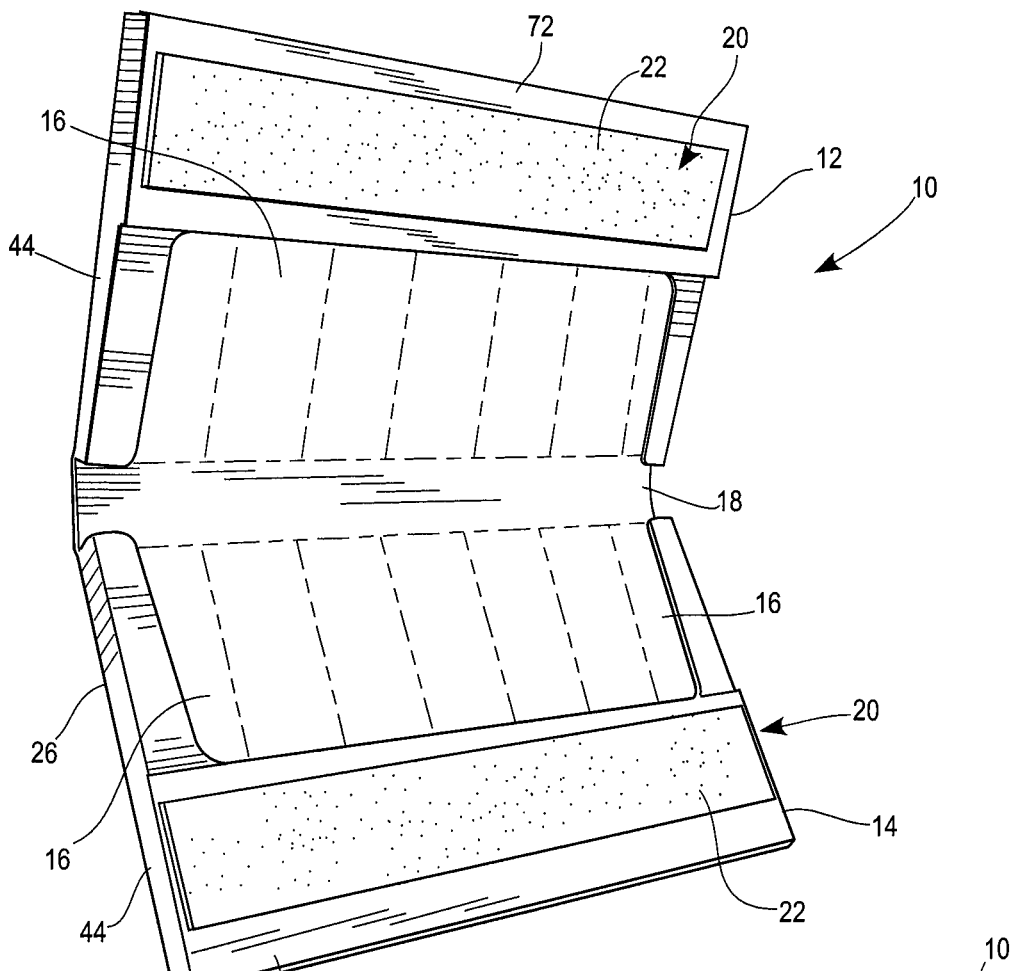
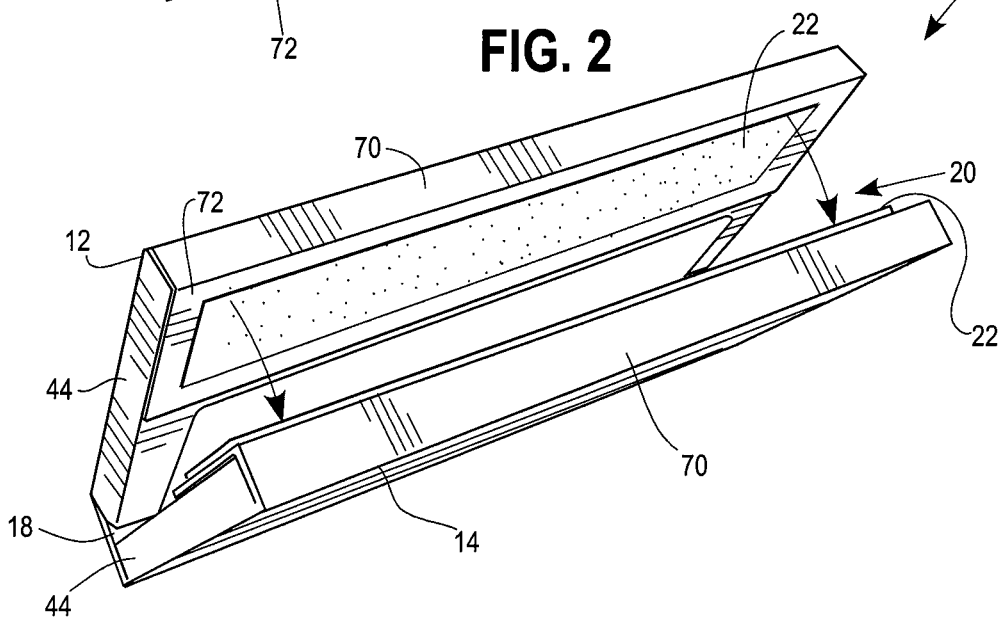

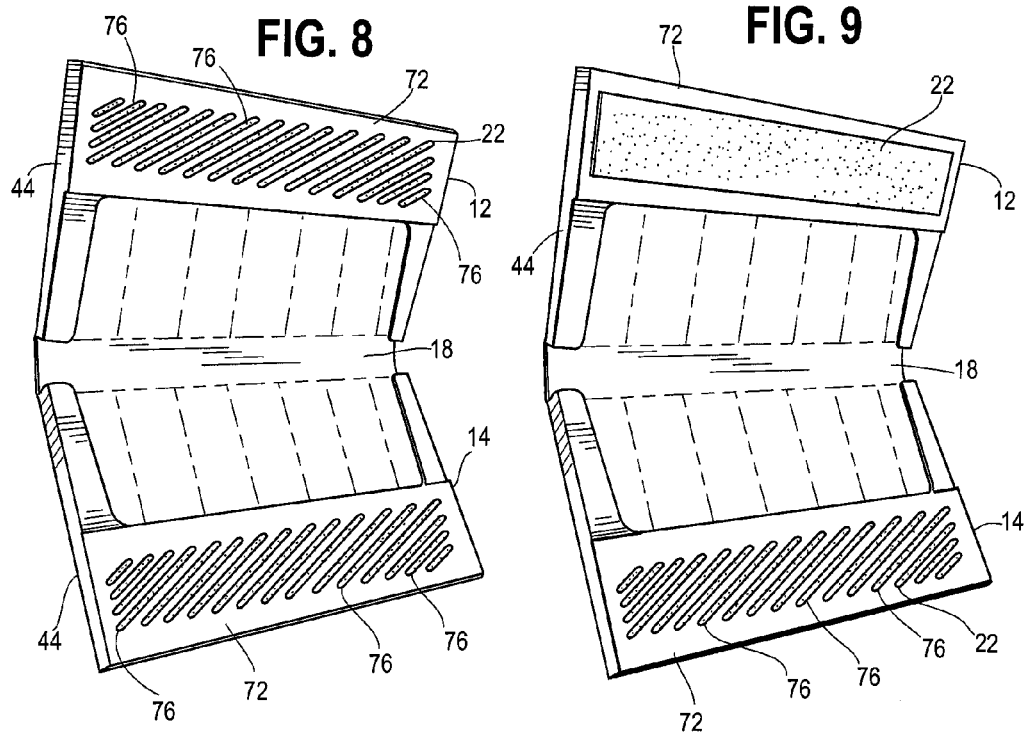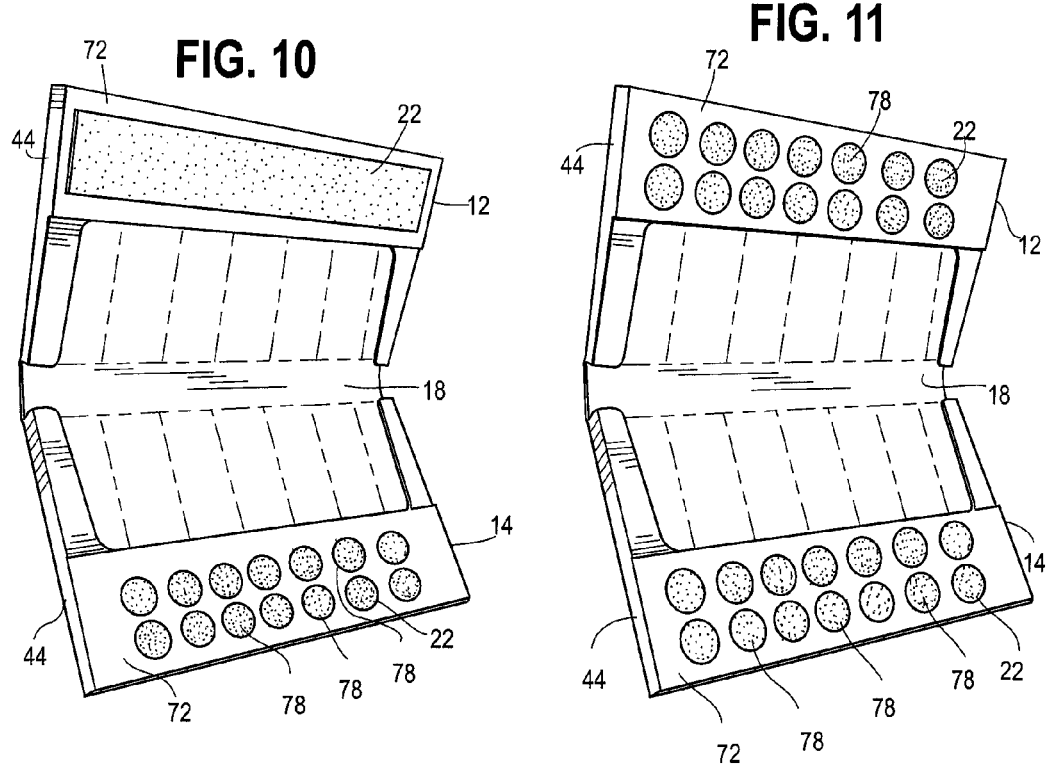

PACKAGE HAVING AN ADHESIVE-BASED RECLOSABLE FASTENER AND METHODS THEREFOR

CROSS REFERENCE TO RELATED APPLICATIONS

This application claims the benefit of U.S. Provisional Application Ser. No. 61/308,540 filed Feb. 26, 2010; U.S. Provisional Application Ser. No. 61/317,592 filed Mar. 25, 2010; U.S. Provisional Application Ser. No. 61/407,406 filed Oct. 27, 2010; and U.S. Provisional Application Ser. No. 61/407,409 filed Oct. 27, 2010, all of which are incorporated herein by reference in their entirety.

FIELD

This disclosure relates generally to reclosable packaging, and more particularly to adhesive-based reclosable packaging.

BACKGROUND

Reclosable packaging is desirable when the packaging is used to store products that can be removed over time requiring a user to repeatedly open and reclose the package. A reclose feature on the packaging allows a consumer to repeatedly open and close the packaging during use without having to use secondary devices, such as clips. One common type of reclose feature for a carton, box, or envelope-type package is a tab and slot-type closure. In such configurations, the package is closed by inserting the tab into the slot. This type of closure may be found, for example, on cardboard cartons or boxes, such as cereal boxes and gum boxes.

Tab and slot-type reclosable packages can, in some cases, be cumbersome to close because of the difficulties inherent in (1) aligning the tab with the slot, which often may be narrow and only slightly larger than the tab, and then (2) getting the entire width of the tab through the slot. In many cases, the user may need both hands to manipulate the tab and slot operation to open and reclose the package. In other cases, the tab may tear upon opening rending the tab and slot in operable. Additionally, some cartons utilizing this type of closure provide the tab on a pivotable cover that extends from a body of the carton. In such cartons, the pivotable cover requires additional packaging material, which can result in increased material and packaging costs.

SUMMARY

A package, such as a box, carton, envelope, and the like is provided that includes an adhesive-based reclosable fastener. In one aspect, the package includes at least a first compartment and a second compartment with a connecting portion therebetween. The first and second compartments are configured to be shifted between a closed configuration with the first and second compartments adjacent one another and an open configuration with the first and second compartments shifted apart. In another aspect, the package also has a reclosable adhesive-based fastener including opposing portions of adhesive arranged on the first and second compartments so that the opposing portions of adhesive are adhered together when the package is in the closed configuration and configured for repeated peel and reseal bonding to allow repeated opening and closing of the carton.

In yet another aspect, the adhesive can be a UV-cured pressure sensitive adhesive that includes at least a UV-curable oligomer, a tack control component, and an optional at least one elastomeric material. The UV-cured pressure sensitive adhesive has an adhesive component ratio or ACR where the weight percent of the UV-curable oligomer relative to the sum of the weight percents of the tack control component and the optional at least one elastomeric material is about 0.5 to about 1.5. The adhesive may further have a first peel adhesion of about 200 grams per linear inch (gpli) to about 900 gpli with up to five subsequent peel adhesions being about 30 percent to about 200 percent of the first peel adhesion.

In another aspect, a method of forming a package using an adhesive-based reclosable fastener is provided. In one aspect of the method, first and second portions of a resealable adhesive are applied to a carton blank. Next, portions of the carton blank are folded to define a first compartment having at least a front wall. The first portion of resealable adhesive is positioned on the front wall of the first compartment. Another portion of the package blank is folded to define a second compartment having at least a front wall. The second portion of resealable adhesive is positioned on the front wall of the second compartment. The method may further include pivoting the first and second compartments about a connecting portion that extends between the first and second compartments so that the first and second compartments are positioned adjacent to one another to adhere the first and second portions of the resealable adhesive disposed thereon to one another.

BRIEF DESCRIPTION OF THE FIGURES

FIG. 1 is a perspective view of an exemplary reclosable package having first and second compartments;

FIG. 2 is a perspective view of the reclosable package of FIG. 1;

FIGS. 8-13 are perspective views of alternative reclosable packages; and

DETAILED DESCRIPTION

Figure 3:
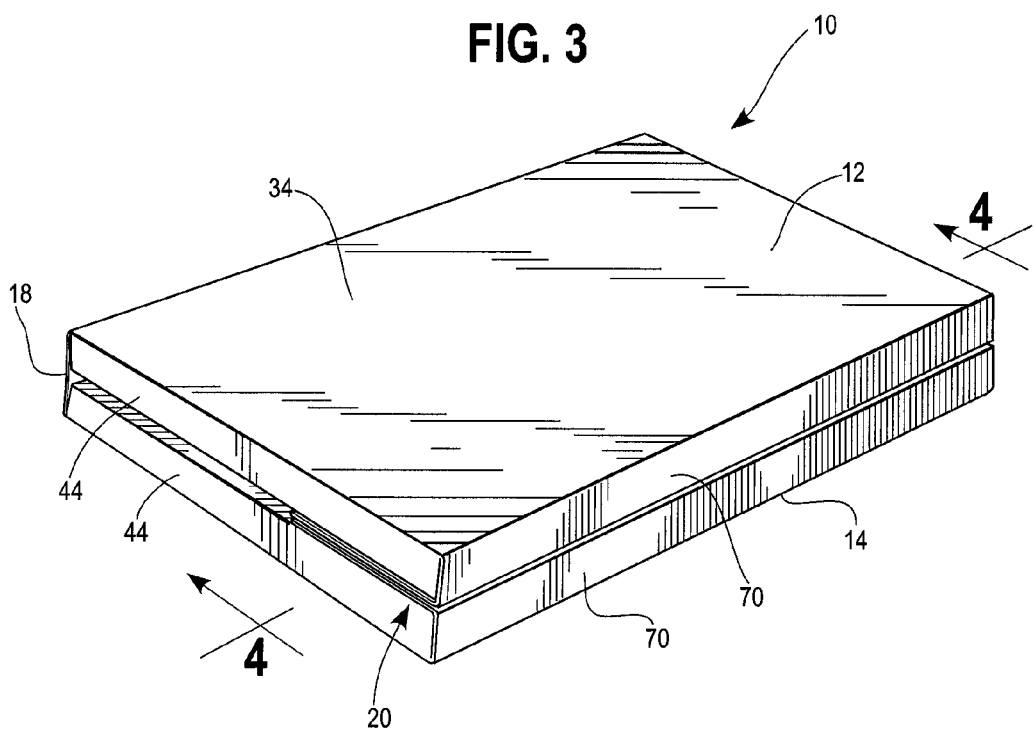
FIG. 3 is a perspective view of the reclosable package of FIG. 1 shown in a closed configuration.
Figure 4:
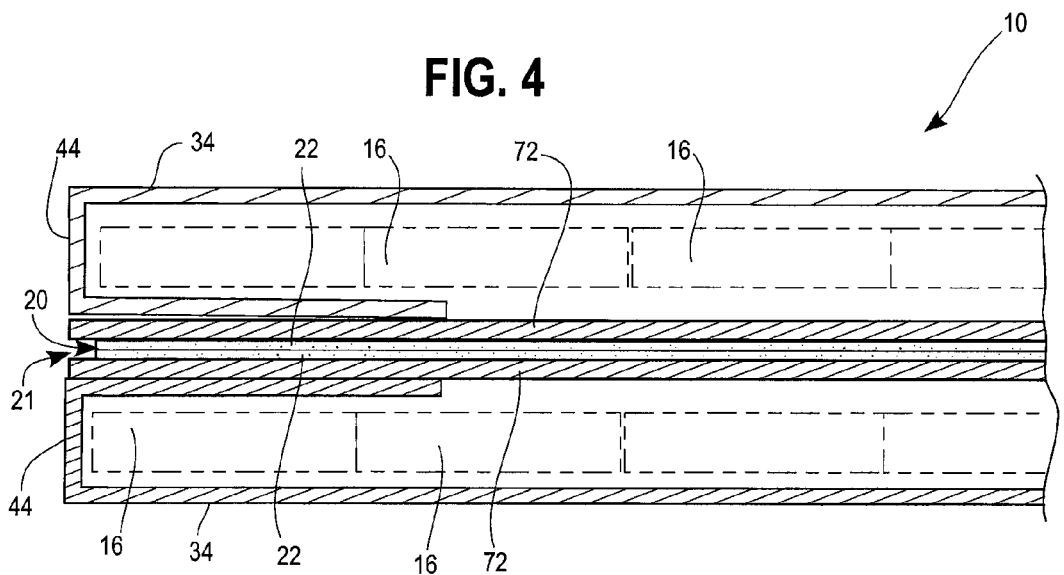
FIG. 4 is a cross-sectional view of the reclosable package of FIG. 3 generally taken along line 4-4.

A reclosable package is described herein that includes an adhesive-based reclosable fastener supplied from a low-tack adhesive. By one approach, the reclosable fastener is provided on packages, cartons, boxes, containers, envelope, and the like. The packages are preferably constructed from relatively rigid materials such as cardboard, foil, metal, paperboard, self-supporting plastics, laminates, combinations thereof, and the like.

In one aspect, the adhesive-based reclosable fastener includes opposing portions, layers, strips, patterns, or discrete patches of the low-tack adhesive that are arranged and configured on opposing sections of the package to releasably adhere together in order to close the package. In another aspect, the adhesive used for the fastener is configured to provide a relatively high cohesive bond strength, but at the same time a relatively low tack so that it can function as an effective reclosable fastener even when exposed to with debris, crumbs, lint, small particles, and the like.

By one approach, the adhesive-based reclosable fastener and/or package constructions herein are generally constructed to minimize the adhesion of the fastener to undesired surfaces, but still function at the same time as an effective reclosable fastener. That is, the adhesive-based fastener and/or package has a unique formulation and construction to achieve select tack and peel values so that the adhesive-based fastener can be opened and closed multiple times to seal the contents in the package during use by a consumer, but at the same time, not delaminate from the opposing package sections. To this end, the reclosable fastener generally includes a UV-cured adhesive with relatively low tack levels to minimize adhesion to the unwanted surfaces, a selected bonding or opening peel strength sufficient to enable secure reclosure of the package, and a peel strength robust enough to enable repeated opening and reclosing of the package. The adhesive-based fastener, at the same time, also has a strong bond to the package substrate so that the adhesive does not delaminate upon opening of the package.

By another approach, the reclosable adhesive-based fastener may include specific blends of a UV-curable acrylic oligomer and a tack control agent. In yet other approaches, the reclosable adhesive-based fastener may include specific blends of the UV-curable acrylic oligomer, the tack control agent, and an elastomer (rubber) component. Preferably, the UV-cured, adhesive-based reclosable fastener is a UV-cured pressure sensitive adhesive (PSA) exhibiting good cohesive properties and low tack, but, despite the low tack, still forms a strong bond to the package substrate forming the opposing package panels.

As generally understood, a cohesive-based material typically adheres more readily to like materials (i.e., self-adhesion) rather than to non-like materials. Suitable adhesive materials used herein generally exhibit a relatively low tack to undesired surfaces, but at the same time still exhibit a good bond strength to desired surfaces (such as no delaminating from the package), and relatively good cohesive or self adhesion bond strength to like surfaces to hold the package closed, but still permit the package to be openable by hand. The selected adhesive-based materials also permit debonding or peeling from such like materials so that the adhesive layers may be repeatedly peeled apart without substantial damage to the adhesive material and/or any underlying package substrate. When the adhesive material is debonded or peeled apart, the selected adhesive materials have sufficient internal integrity and generally peel apart at an adhesive bonding interface substantially cleanly without substantial material picking, stringiness, delamination from the package substrate, and/or other substantial disfigurations of the material (i.e., globbing, pilling, etc.). As discussed in more detail below, the adhesive-based fasteners described herein maintain a peel adhesion where opposing adhesive portions contact each other with an average initial peel adhesion greater than about 200 grams per linear inch (gpli) and, preferably, between about 200 gpli and about 900 gpli. Moreover, in some instances, the adhesive-based fasteners retain greater than about 200 gpli and/or at least about 30% to about 200% of the average initial peel adhesion after five repeated seal and unseal operations.

In yet another aspect, a package having the adhesive-based fastener disposed thereon is also constructed so that the bond or peel strength of the UV-cured, adhesive-based reclosable fastener to package substrate forming the package, such as relatively rigid package substrate walls, is generally greater than the opening peel strength between the opposing portions of the fastener itself. In this manner, the reclosable fastener generally remains adhered to the package substrate and does not pick, string, or delaminate from the package substrate when the package is opened by a consumer and the fastener is peeled open. For example and in one approach, the bond or peel strength of the adhesive to the package substrate is greater than about 600 gpli (in some cases, greater than about 900 gpli) and is capable of withstanding multiple peel and re-seal cycles without detachment from the package substrate. In addition, the adhesive is cured so that it is capable of withstanding more than 100 rubs with methyl ethyl ketone (MEK) solvent.

In addition to providing an effective reclosable fastener, the adhesive constructions described herein advantageously allow the adhesive to be pre-applied onto the packaging substrate materials, such as carton blanks, prior to package formation. For example, the package substrate, after adhesive application, may be cut into blanks, and subsequently stacked, handled, and unstacked without substantial unwanted sticking of adjacent blanks. This can further streamline cartoning operations because the adhesive can be applied as a part of a manufacturing/printing process. This avoids having to integrate adhesive coating machinery into the cartoning line, which is commonly required by traditional tacky adhesives. Further, the low tack adhesive fastener described herein advantageously reduces packaging material, such as about 20%, as compared to other packages using tab and slot arrangements to close cover flaps or similar reclose features.

Turning now to the details of an exemplary reclosable package or carton 10 illustrated in FIGS. 1-6. The reclosable package 10 includes first and second compartments 12 and 14, which in this approach, are sized to receive one or more thin, elongate products, such as the exemplary pieces of gum 16 illustrated in FIG. 1. It will be appreciated, however, that package 10 is only but one example of a suitable reclosable package using the adhesive-based reclosable fasteners described herein. Other packages may have varying shapes and configurations depending on the desired use.

As shown in FIG. 1, the first and second compartments 12 and 14 are hinged or pivotably connected by a connecting portion, bridge, or flap 18 that spans between and connects adjacent ends of the first and second compartments 12 and 14. The reclosable package 10 further includes a resealable adhesive-based fastener 20. As illustrated in FIG. 1, the adhesive-based fastener 20 in this form of the package is opposing elongate bands of the adhesive extending about major inner faces of the compartments 12 and 14. Alternative configurations of the adhesive are discussed later.

The adhesive-based fastener 20 allows the package 10 to be repeatedly closed or opened by adhering or peeling apart opposing adhesive portions 22, which are applied on the major, inner faces of the first and second compartments 12 and 14. When the adhesive portions 22 are adhered together, the package 10 is in a closed configuration, such as shown in FIG. 3. When the adhesive portions 22 are separated or peeled apart, such as shown in FIG. 1, the package 10 is in an open configuration. The open configuration allows a user to gain access to an interior 24 of one or both of the first and second compartments 12 and 14 to access the one or more products 16 contained therein. Thereafter, a user can close the package, such as by pivoting or shifting, the first and second compartments 12 and 14 generally toward each other and apply light pressure to adhere the opposing adhesive portions 22 together to reclose the package 10 as exemplified in FIG. 2. As discussed more fully below, the adhesive used to form the adhesive-based fastener 20 has a unique formulation configured to permit multiple open and reclose operations with minimal loss of bonding strength.

Figure 5:
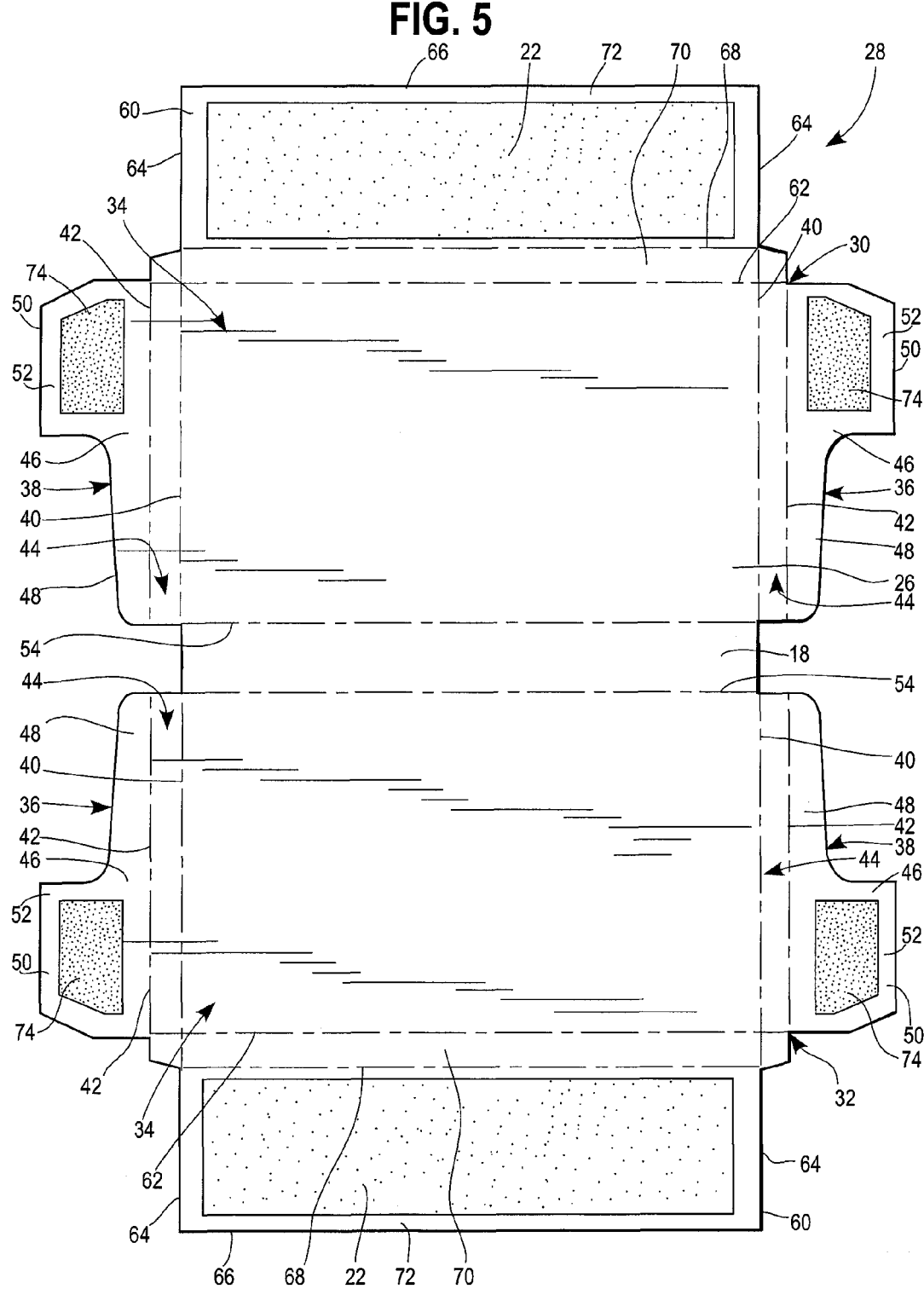
FIG. 5 is a top plan view of an exemplary carton blank.

Turning to FIG. 5 for a moment, the package 10 can be formed from carton blank, such as a die cut, unitary or single piece carton blank 28, which may be paperboard, cardboard, laminate, plastic, foil, metal, and the like. The blank 28 includes upper and lower portions 30 and 32 joined by the intermediate, connecting portion 18. As explained in more details below, the blank may be scored in a manner to be folded about the various score lines so that the upper and lower portions 30 and 32 form the first and second compartments 12 and 14. In this approach, the upper and lower portions 30 and 32 are generally mirror images of one another about the connecting portion 18.

Turning to more details of the carton blank 28, the blank upper and lower portions 30 and 32 each include a central, generally planar portion that defines a back panel or wall 34 of the compartments. Lateral side flaps 36 and 38 extend from opposing lateral edges or fold lines 40 of the back panel 34. The lateral side flaps 36 and 38 are generally mirror images of each other. Each lateral side flap 36 and 38 includes an intermediate fold line 42 extending generally parallel to the lateral fold line 40. The fold lines 42 and 40 define a generally rectangular side panel or wall 44 of the compartments.

A side wing 46 is defined by the remaining portion of each lateral side flaps 36 and 38 and extends outwardly of the intermediate fold line 42. The side wing 46 includes a narrow top end portion 48 and a generally rectangular bottom end portion 50. The narrow top end 48, which tapers outwardly, joins with a shoulder portion of the bottom end 50 forming a tab 52 of the bottom end 50 that projects outwardly beyond the top end 48.

The connecting portion 18 extends from a top edge or fold line 54 of the back panel 34 to span between and connecting the upper and lower blank portions 30 and 32. A bottom flap 60 is positioned on an opposite side of the back panel 34 from the connecting portion 18 and extends from a bottom edge or fold line 62 of the back panel 34. The bottom flap 60 includes side edges 64 that extend generally orthogonally away from the back panel bottom fold line 62 to a bottom edge 66. The bottom flap 60 further includes an intermediate fold line 68 extending generally parallel to the back panel bottom fold line 62 that divides the bottom flap 60 into a bottom panel or wall 70 positioned adjacent to the back panel bottom fold line 62 and a front panel or wall 72 positioned outwardly of the intermediate fold line 64. The front panel 72 has a major face thereof and is illustrated as generally rectangular, but can alternatively include inwardly tapering side edges as desired.

By one approach, the side panels 44 and the bottom panel 70 have a substantially similar width, so that after carton formation thereof (to be described below), the first and second compartments 12 and 14 have a substantially constant depth. In such a case, it is also preferred that that the connecting portion 18 has a width substantially equal to twice the width of the panels 44 and 70 so that the front panels 72 of the first and second compartments 12 and 14 can be substantially flush when the first and second compartments 12 and 14 are in the closed configuration.

To form the compartments, permanent adhesive portions 74 are deposited on and, in one approach, positioned generally centrally on the bottom end portions 50 of the side wings 46 of the lateral side flaps 36 and 38. These permanent adhesive portions 74 are configured to form a strong and non-reclosable bond may include suitable polyolefin, hot melt, or other generally permanent adhesives.

The adhesive-based fastener 20 is also positioned on the carton blank. In one approach, the opposing adhesive portions 22 of the fastener 20 are applied on and, in one approach, extend across the major faces of the front panels 72 of the first and second compartments 12 and 14. In the form illustrated in FIGS. 1 and 5, for example, the opposing adhesive portions 22 are generally wide strips or bands of the adhesive extending across the major face of the panels 72; however, various applications may require less adhesive or adhesive applied in various shapes, patterns, sizes, amounts, thicknesses, etc.

In some cases, the package opening force may be proportional to the adhesive amounts or the total adhesive contact/surface area exposed for adhesion. By some approaches, the adhesive portions 22 may be provided in selected intermittent portions, patterns, or patches to modulate the package opening force and tailor the peel force to the requirements of each type of package application. That is, if more bonding force is needed, then a larger surface area of adhesive 22 relative to surface area of packaging substrate (i.e., the front panel 72) is provided. If less bonding force is needed, then a smaller surface area of adhesive 22 relative to packaging substrate (i.e., the front panel 72) is provided. Thus, it is possible to customize the package opening force simply by altering the ratio of exposed adhesive/adhesive contact area 22 to the area of the major face of the front panel 72 by choice of coating pattern and surface area of adhesive without needing to alter the adhesive formulation, thicknesses, and composition. This advantageously provides for a robust adhesive that can be used for many different types of packages.

There are many types of patterns or portions of adhesive that can be used to modulate adhesive force. The patterns can be repeating in regular, symmetrical, irregular or non-symmetrical patterns. Examples include, but are not limited to, circles, squares, other shapes, lines, strips oriented at varying angles and degrees of inclination. Turning to FIGS. 8-11, some examples are shown. By one approach and as shown in FIGS. 8 and 9, one or both of the adhesive portions 22 on compartments 12 and 14 can have strips or rows 76 of adhesive applied thereto or deposited thereon. In the illustrated forms, the adhesive strips 76 are thin, elongate portions of the adhesive spaced from one another and disposed at approximately a 45° incline relative to adjacent edges of the front panel 72; however, varying angles, spacing, and degrees of inclination can be used. By one approach, both adhesive portions 22 of the first and second compartments 12 and 14 include oppositely aligned adhesive strips 76 inclined at substantially the same angle so that when the front panels 72 are pivoted together, opposite adhesive portions bond together in order to close the package 10. Alternatively, only portions of the opposite adhesive strips 76 may be aligned when closed; thus, the compartments will be adhered in such instances with less bonding force generally due to a lower amount of overlap between the adhesive portions 22. Alternatively and as shown in FIG. 8, the adhesive strips 76 of one of the first or second compartments 12, 14 can extend at a generally orthogonal angle to the adhesive strips 76 of the other compartment (not shown). By this alternative approach, when the front panels 72 are pivoted together, the adhesive strips 76 generally intersect each other and adhere at those intersections.

By another approach, one of the adhesive portions, such as the adhesive portion 22 of first compartment 12, can be a solid or relatively large rectangular adhesive patch in combination with the smaller adhesive strips 76 provided on the second compartment 14 as generally shown in FIG. 9. In such form, the adhesive strips 76 generally lower the adherable surface area, which decreases the bonding force holding the compartments together. By utilizing adhesive strips 76 in combination with a relatively large rectangular patch 22, the amount of adhesive used to form the package closure is also reduced and the adhesive bonding force holding the compartments together can be varied as desired depending on the size of the strips 76 and the form and shape of the opposing adhesive portions 22. By one approach, the second compartment 14 including the adhesive strips 76 includes a sufficient number of the spaced adhesive strips 76 so that the totality of the strips covers approximately the same surface area or footprint of the front panel 72 as the relatively large adhesive patch 22 on the first panel 14. As will be appreciated, the number, spacing, inclination, width, and length of the adhesive strips in the examples of FIGS. 8 and 9 may vary as needed for a particular application and adhesive bonding force.

In another form, as shown in FIGS. 10 and 11, the adhesive 22 can also be applied to or deposited on the front panel 72 in other shapes, such as one or more circles 78 as shown in these figures. The circles 78 can form one or both of the adhesive portions 22 depending on the desired strength of adhesion between the compartments 12 and 14, the desired amount of adhesive used, or the like as discussed above. Although circles are shown, any suitable shape can be utilized, such as rectangles, triangles, other regular or irregular polygons, curvilinear shapes, or combinations thereof. Similarly to the adhesive strips 76, such as when circles form both adhesive portions 22 (FIG. 11), the package can then align the circles 78 to close and adhere the compartments together. Improper alignment would not reseal the package or would reseal the package with significantly less adhesion between the compartments. By using the strip or discrete shapes, the configuration tends to reduce the amount of low tack adhesive required on the pack, which at the same times allows a slightly milder reseal action to occur. In addition, such configuration would tend to only allow resealing when the various strips or discrete adhesive portions are aligned with one another when closed.

Figure 6:
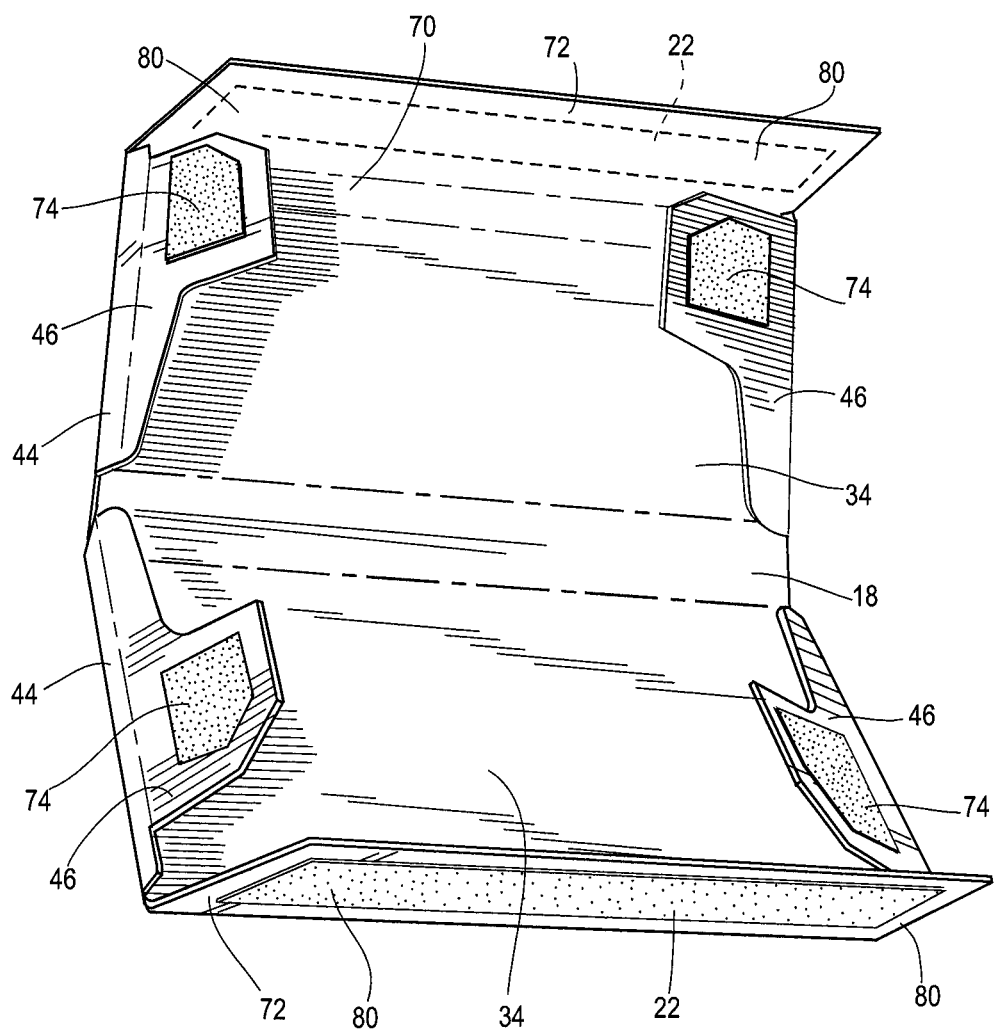
FIG. 6 is a perspective view of the carton blank of FIG. 5.

So configured, the carton blank 28 can then be assembled into the package 10, an intermediate stage of which is shown in FIG. 6. To form the package, the lateral side flaps 36 and 38 may first be folded or pivoted generally inwardly about the fold lines 40 and 42 so that the side panels 44 are generally orthogonal to the back panel 34 and the side wings 46 are spaced and generally parallel to the back panel 34 with the permanent adhesive portions 74 facing outwardly away from the back panel 34. Then, the bottom flap 60 is then folded or pivoted inwardly to a position adjacent the back panel 34 so that the bottom panel 70 is generally orthogonal to the back panel 34 and the front panel 72 is spaced and generally parallel to the back panel 34. Opposing lateral end portions 80 of the front panel 72 can then be permanently secured or affixed to the side wings 46 of the lateral side flaps 36 and 38 by the permanent adhesive portions 74. Alternatively, the adhesive portions 74 could be deposited on the front panel end portions 80. Both compartments may be fabricated in a similar manner.

With this positioning, the adhesive portions 22 of the adhesive-based fastener 20 applied to the major, inner faces on the front panel 72 are now each facing outwardly away from the back panel 34. With the first and second compartments 12 and 14 so formed, the one or more products 16 can then be deposited or placed within each of the compartments 12 and 14 via the compartment interiors 24. Once the compartments are filled with a desired amount of the products 16, the first and second compartments 12 and 14 can then be shifted or pivoted generally toward each other about the connecting portion 18, as shown in FIG. 2, and secured together by an application of gently inward pressure on the back panels 34 of the first and second compartments 12 and 14, which adheres the opposing adhesive portions 22 of the fastener 20 together.

For the adhesive-based fastener 20 to function properly, the substrate 26 forming the package has an internal strength greater than the peel strength of the fastener 20 about the substrate. Thus, when the package 10 is opened, the peeling force will occur along a cohesive/cohesive bond line 21 (FIG. 4) rather than a delamination of the package substrate. If the adhesive peel strength exceeds the internal strength of the substrate, tearing, delamination, and substrate failure is likely resulting in an improperly functioning fastener. By one approach, the package substrate 26 can achieve the desired strength by laminating or coating a polymer layer onto the package substrate. By another approach, paperboard can be impregnated with a chemical strengthening agent, such as discussed in U.S. Pat. No. 4,617,223, which is hereby incorporated by reference herein in its entirety. For example, the chemical strengthening agent may be an isocyanate or polyisocyanate that reacts with hydroxyl groups within a paperboard substrate to form a cured polyurethane reinforcement. Other strengthening agents may also be used.

Figure 7:
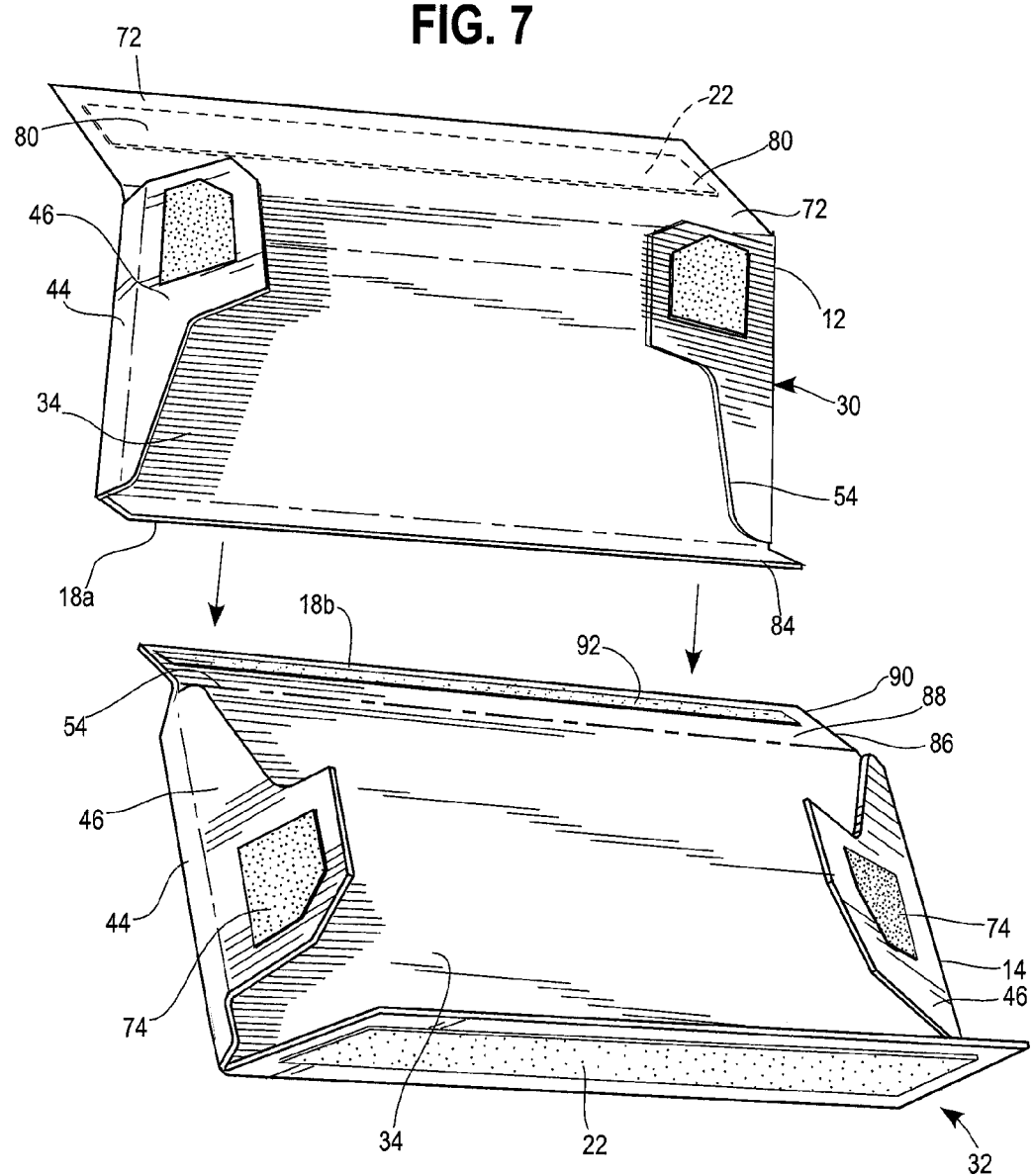
FIG. 7 is a perspective view of an alternative, exemplary two-piece carton blank.

Turning now to FIG. 7, an alternative form of the package 10 is shown formed using separate die cut blanks for each compartment 12 and 14 that are glued or fastened together. By this approach, the first and second compartments 12 and 14 are similarly structured and formed, but the connecting portion 18 is divided into separate segments 18a and 18b that can be subsequently overlapped and adhered or otherwise secured together via glue, adhesive, fasteners, welding and the like to connect the first and second compartments 12 and 14. In the illustrated form, the blank first portion 30 includes a first connecting portion segment 84 that extends away from the back panel fold line 54. The blank second portion 32 includes a similar connecting flap 86 that extends away from the back panel fold line 54 and has a second connecting portion segment 88 adjacent to the back panel top fold line 54 and a securing segment 90 positioned outwardly of the second connecting portion segment 86. As shown in FIG. 7, a suitable adhesive 92 can then be disposed along the securing segment, onto which the first connecting portion segment 84 can be overlapped and secured thereby. The remaining portions of the package 10 can be formed as described above.

The fold lines 40, 42, 54, 56, 62, and 68 can take any suitable form, including, for example, scored lines, scribed lines, regular and irregular perforations, a living hinge, a crease, combinations thereof, or other like areas of weakness. Additionally, the fold lines 40, 42, 54, 62, and 68 can be created by any suitable means, including, one or more dies, rotary dies, lasers, or the like.

By one approach, the package substrate 26 can be paperboard, laminate, cardboard, corrugated cardboard, rigid plastic, foils, metals, or mixtures thereof. By a further approach, the package substrate 26 may be a SBS (solid bleach sulfate) paperboard, in part because of the good folding properties of this material. Alternatively, package substrate 26 could be composed of some other suitable material, such as polyvinyl chloride (PVC).

In another approach, at least a portion of the package substrate 26, and in some cases an outer layer that contacts the adhesive 22, may include a polymer coating, layer, filler and/or sealant layer to enhance interfacial bonding between the adhesive 22 of the fastener 20 and the package substrate 26. In one form, the polymer coating may be selected from ethylene vinyl acetate (EVA), a polyolefin (such as polyethylene), or blends thereof. If used, the polymer layer may include the adhesion promoting filler particles. In one form, the filler may be micro- or nano-sized fillers of clay, calcium carbonate, montmorillonite, microcrystalline silica, dolmite, talc, mica, oxides, (silicon oxides, aluminum oxides, titanium oxides, and the like) and other additives and/or combinations thereof, into or onto at least polymer coating, the front panel 72, a sealant layer hereon, or a surface layer(s) of the package substrate 26 to enhance the bonding of the fastener adhesive 22 to the package substrate 26.

In particular, an organoclay filler may be used, and in one aspect the organoclay filler is organically modified montmorillonite. Organoclay is an organically modified natural clay such as a montmorillonite clay that is processed or treated with surfactants such as quaternary ammonium salts. Montmorillonite is a phyllosilicate group of minerals that typically comprises a hydrated sodium calcium aluminum magnesium silicate hydroxide. While not wishing to be limited by theory, the organoclay-filled substrate can have the ability to aid in producing operable and reclosable adhesive-based closures because the filler helps form a strong bond between the low tack adhesive and the package substrate so that the adhesive does not delaminate from the package substrate 26 when the package 10 is opened.

Effectively dispersing the clay or other filler in polyethylene and EVA that may be used for a sealant layer or other coating of the package substrate 26 can be a challenge due to incompatibility of clay fillers and certain polymers. Thus, supplying the filler using a filler composition including the filler blended with a compatible carrier helps aid in the mixing and dispersing of the filler into the sealant layer. By one approach, the clay filler can be supplied in a maleic anhydride grafted linear low density polyethylene carrier (MA-LLDPE) used in the coating or applied to the substrate. While not wishing to be limited by theory, the maleic anhydride portion of the carrier has an affinity for the clay filler and the polyethylene portion of the carrier mixes well with other polymers of the sealant layer. Exemplary clay filler compositions may be obtained from PolyOne Corporation (Avon Lake, Ohio). Without wishing to be bound by theory, it is believed that the organically modified clay particles, which may be highly polar, and/or the maleic anhydride grafted linear low density polyethylene (MA-LLDPE) carrier resin present with the clay fillers serve to promote adhesion of the cured adhesive coating to the substrate surface by increasing the surface energy of the substrate layer.

Additionally, it is also believed that on a microscopic level the clay or other filler additive(s) may impart surface roughness to the substrate, positively affecting the coefficient of friction of the substrate and increasing the available contact area between the substrate and the coating, thereby providing more sites for chemical and/or mechanical bonding to occur. By one approach, approximately 0.5% to about 20% by weight of the filler composition in the sealant layer is expected to have a beneficial impact on bond strength of the fastener 20 to the package substrate 26 so that the bond to the substrate is greater than the peel adhesion between the adhesive portions 22 such that the fastener 20 does not delaminate upon opening. Additionally, the filler may roughen the surface of the substrate enabling it to slide freely over metal surfaces of packaging equipment without binding, thus enabling the reduction or elimination of a migratory slip additive in the polymer coating or layer.

In some instances, an optional component of the polymer layer on the substrate 26 can include a migratory slip additive, which helps to decrease coefficient of friction between the substrate and other surfaces, allowing the substrate to slide freely over metal surfaces or itself. In one aspect, an erucamide slip additive (i.e., an unsaturated fatty primary amide) can be provided. Slip additives ranging from 2000 ppm to 7000 ppm have been used; however, it has been discovered that at these high levels it is difficult for the adhesive to bond to the low energy surface of the substrate because the slip additive blocks surface sites where adhesion can take place. However, the addition of the filler allows for a much lower level of the slip additive to be used, such as less than about 1000 ppm. In other cases, the substrate has less than about 700 ppm of the slip additive or in yet other cases no slip additive. Since the use of the filler reduces the coefficient of friction between the substrate and other surfaces, an effect that was previously achieved with addition of the migratory slip additive, this allows for the migratory slip additive concentration to be lowered or eliminated. A lower migratory slip additive level than typically used can also help to increase the bonding of the cured coating to the substrate both initially and over time because there is less of the additive to interfere with the bonding of the coating to the substrate. While not wishing to be limited by theory, it is believed that the fatty acid amides in slip additives, which are low molecular weight components, can migrate or bloom to the surface of the polymer layer affecting the strength of the bond between the substrate surface and the adhesive fastener 20. While corona treating or flame treating may initially burn off any fatty acid amides on the surface of the polymer layer resulting in an initial good bond strength of the adhesive. Over time additional fatty acid amides can migrate or bloom to the polymer layer surface, which results in a reduced bond strength over an extended shelf life.

Additionally, prior to applying the adhesive to the package substrate 26, in some instances, the substrate can undergo a surface pretreatment to increase the surface energy, and/or application of a primer coat. For example, possible surface treatments may include corona treating, plasma treating, flame treating, and the like or chemical coatings, such as primers or adhesion promoters may also be used. A corona treatment can increase the surface energy of the substrate which improves the coating's ability to bond and remain bonded to the substrate. A corona pretreatment can include a cloud of ions that oxidize the surface and make the surface receptive to the coating. The corona pretreatment basically oxidizes reactive sites on the polymer substrates. If corona treating, ideally the surface energy after treatment should be about 40 dynes or greater.

Without wishing to be bound by theory, in some cases, it is believed that the corona treatment of the substrate surface helps to provide for a strong bond between the coating layer and the substrate surface due to the increased surface energy of the substrate surface. In addition to the corona treatment, the combination of the pretreatment with a low concentration of a slip additive and the incorporation of a filler composition within the substrate 26 together result in a strong bond between the reclosable fastener and the substrate.

An exemplary assembly process will now be described with reference to packaging a gum product in the package. The assembly process will, of course, vary if the product is different. As shown in phantom in the drawings, the package 10 may be sized and configured to hold gum pieces such as elongate slabs of gum in a vertical orientation. However, the gum may also be placed in the package in different orientations as needed for a particular application. Typically, a gum product is manufactured, then chilled and aged. Slab and stick gum is prepared by rolling the gum product into sheets, cutting it into lanes, then scoring it into individual pieces. In some cases, it may be useful for the individual slabs of gum to be individually wrapped in separate sheets of waxed paper and then a row of such gum slabs wrapped in such manner can be placed in a foil half-pouch (not shown). The gum package is assembled at the same time. In some instances, the carton substrate may be printed, cut, scored, and the adhesive is printed or applied thereon in the desired pattern and thickness for the desired peel forces. The carton blank is then folded, filled, assembled, closed, and a clear film with tear tape (not shown) may be attached to the outside. A display tray with twelve such packages may be prepared, these display trays are over-wrapped with clear film, and then they are placed in corrugated shippers, palletized, and then shrink-wrapped. It is then warehoused and shipped to distribution centers. In other cases, the tray may hold more or less packs as needed.

In some embodiments, the gum slabs may be adhered or otherwise attached to the package or compartment thereof. This may keep the gum slabs from falling out or tipping over inside of the package. Thus, the gum slabs may be releasably secured or attached to or into the package. There are many possibilities for adhering the gum slabs into the package. One possibility would be to place the gum slabs into or onto a foil half pouch, paper or plastic strip, wrap around band, or other type of sheet-like material (collectively referred to herein referred to as a "sheet") before it is placed into the package. The sheet may include a single layer or multiple layers. One of the layers may include moisture barrier material to reduce the amount of moisture absorbed by the gum slabs when the gum slabs are in the package.

As an alternative to using a sheet, the gum slabs could be placed directly into the package without the use of a sheet. If the slabs were placed directly into the package, they (or their wrappers) could be adhered thereto or not. For example, the gum slabs may be adhered via wax or other adhesive to one or more inner surfaces of the package. The wax or adhesive may be included or provided in one or more strips or bands of adhesive that adhere to more than one gum slab. The package itself may contain a paraffin or other waxy material on its inner surface to adhere to the gum slabs. Alternatively, a plurality of wax or adhesive spots or areas may be created on one or more inner surfaces of the package, each attaching to one or more of the gum slabs or wrappers around the gum slabs. If wrappers around the gum slabs are used, the adhesive used to adhere the gum slabs to the package will adhere the wrappers to the package. The adhesive bond may be strong enough to prevent or reduce the likelihood of the wrappers being removable from the package. Thus, the wrappers will remain in the package when the gum slabs are removed from the package and the wrappers. Alternatively, the adhesive bond between the wrappers and the package may be such that the wrapper and the gum slabs can be removed from the package, but strong enough to keep the gum slabs in the wrappers from falling out of the package or tipping over in the package. Examples may be provided in International Publication No. WO 2005/110885, which is incorporated herein by reference in its entirety.

As another alternative, the gum slabs may be adhered to each other, regardless of whether or not a sheet is used in the package. For example, drops or a strip of adhesive may be placed on the gum slabs or their wrappers such that the gum slabs or their wrappers are held together. The drops or strip of adhesive may be placed on one or more sides of the gum slabs, which may be placed in a side-by-side configuration in the package. The same or different adhesive also may be used to adhere the gum slabs to the housing and/or to a sheet.

If there is a sheet, it is possible to adhere the gum slabs to the sheet with some type of cold or hot adhesive and then an outer part of the sheet may be adhered to the inner surface or wall of the package. One or more adhesive strips, spots, or other areas may be used to adhere the sheet to one or more inner surfaces of the package. Alternatively, the sheet need not be adhered to the package and simply can be placed inside the package. It may also be desirable to not adhere the slabs to the sheet and then to adhere the sheet to the package. Alternatively, the sheet need not be adhered to the package.

One possibility would include adhering both the sheet and the gum slabs to the one or more inner surfaces or walls of the package. For example, a sheet or pouch could be used that covers only a portion of the gum slabs when the gum slabs are placed on or in the sheet, so that the top portions of the slabs (or their wrappers) extend up above the edge of the sheet when the sheet and the gum slabs are placed inside the package. A strip of adhesive could be applied to the inner back wall of the gum compartment of the package in a position approximately even with or overlapping the upper edge of the pouch. If the adhesive strip was sufficiently large it could allow both the pouch and the top portions of the gum slabs to stick to the inner surface of the package. Alternatively, two different strips of adhesive could be used, one to adhere the slabs (or their wrappers) to the package, and one to adhere the sheet to one or more inner walls or surfaces of the package. These two strips of adhesive could be located on the same inner back wall of the package, or, for example, one could be on the inner back wall of the package to adhere the top portions of the gum slabs to the inner back wall of the package and one on the inner front wall of the package to adhere the sheet to the inner front wall of the package.

Although the above-described package 10 is described in conjunction with slab gum, it could also be adapted to work for other comestibles or even non-food items. In addition, each compartment could hold as few as one large piece of gum. Furthermore, the package described herein could be used to hold other types of individual pieces of consumable products (e.g., cookies, chocolate bars, taffy, toffee, fruit roll-ups, and so forth). Alternatively, it could be used to sell, mail, distribute, or hold non-edible products such as photos, coupons, tickets, stamps, puzzle pieces, game pieces, and so forth. The individual items in the package may all be the same or they may be different items that can be assembled together, or in the case of edible products they may be different types or flavors. The package could also be used to hold pharmaceuticals or nutraceuticals such as pills, vitamins, oral care strips, and so forth or items that may not be chewed or swallowed (e.g., chewing tobacco, pain relieving strips for gum diseases, and so forth).

As can be appreciated, there are many advantages to the adhesive-based fastener and package design. For one, the design delivers reclose functionality equivalent to more common flap-type closures with tab and slot arrangements, but uses up to about 20 percent less material to form the package because the tap is not needed. Another advantage combines adhesive-based reclose functionality with a carton configuration having the ability to size a package for a single row of product, such as a single row of gum slabs as compared to two or more rows of gum slabs adjacent to each other found in the prior packages. In this case, it is easier to extract a single piece at a time, and the remaining pieces are less likely to fall out of the packages. Furthermore, the package 10 has a more pleasing and presentable appearance that may be conducive to sharing the gum products with others. Further, the package securely closes and completely encloses the gum products in an easy and single motion. The user does not need to fumble with inserting a small tab into a narrow slot. The package can be securely closed with one hand by simply pressing the package together with one's fingers.

Turning now to details of the adhesive 22, one example of the low-tack adhesive is described in U.S. Provisional Patent Application No. 61/308,540, filed Feb. 26, 2010, which is hereby incorporated by reference herein in its entirety. By one approach, the opposing adhesive portions 22 can each be supplied in the form of a liquid coating mixture that may be heated and applied to the package substrate 26 in the desired pattern at a warm temperature, such as at about 160° F. (71° C.), but can be in the range of about 86° F. (30° C.) to about 190° F. (88° C.). After application of coating, the applied coating mixture, which can contain an added photoinitiator, can be exposed to UV treatment to cure (polymerize) the coating and to form the solid adhesive-based fastener 20 on the package substrate. In one aspect, the applied coating can have a thickness of about 0.0005 inches, but can be in the range of about 0.0001 inches to about 0.005 inches; however, depending on package design, configuration, and requirements, a much thicker coating can be applied. By one approach, the coating mixture does not contain any solvent that needs to be removed and may be easily applied to the package substrate on high speed coating and printing lines.

The first component of the adhesive is one or more UV-curable acrylate or acrylic oligomers. For instance, the UV-curable acrylic oligomer may be an acrylic or methacrylic acid ester having multiple reactive or functional groups (i.e., acrylic or methacrylic oligomers). In general, a functional group includes one UV reactive site. UV reactive sites are most commonly carbon-carbon double bonds conjugated to another unsaturated site such as an ester carbonyl group. By one approach, the UV-curable acrylic oligomer is an acrylic or methacrylic acid ester of a multifunctional alcohol, which means the oligomer has more than one acrylated or methacrylated hydroxyl group on a hydrocarbon backbone of the oligomer. By one approach, the adhesive may include about 1% to about 90% by weight of the UV-curable acrylic oligomers with functionalities of about 1.2 to about 6.0. In another approach, the UV-curable acrylic oligomers may have a functionality of about 2.0 to about 3.0, and/or be provided in the adhesive in an amount of about 20% to about 70% by weight.

In one form, the multifunctional UV-curable acrylic acid ester is an acrylic acid ester of a vegetable oil having a reactive functionality of 2.0 or greater. In another aspect, the UV-curable acrylic oligomer can comprise an epoxidized soybean oil acrylate. In general, the amount of the UV-curable acrylic oligomers used, based on a preferred adhesive component ratio (ACR) (to be discussed herein), can impact the properties of the final adhesive. For instance, where the amount of the UV-curable acrylic oligomer is too low, based on the preferred ACR, the cure rate of the final adhesive is too slow. On the other hand, where the amount of the UV-curable acrylic oligomer is too high, based on the preferred ACR, the final adhesive may be adequately cured, but can have inadequate self adhesion properties to seal and reseal.

The second component of the adhesive is a tack control agent. By one approach, the adhesive may include about 1% to about 65% by weight of the tack control agent. In another approach, the tack control agent can be present in amounts from about 20% to about 65%. The tack control agent can include a tackifying resin or a curable polymer/monomer combination that when cured can produce the desired levels of tack and self-adhering properties appropriate for the reclosable fastener 20. In one aspect, the tack control agent can comprise an aliphatic urethane acrylated oligomer. Many other types of tack control agents suitable for UV-curable PSA adhesives may also be used in the reclosable adhesive system.

An optional third component of the adhesive is at least one elastomeric or rubber component. By one approach, the elastomeric component may include at least one curable acrylated (i.e., acrylic modified) or methacrylated esters of a hydroxy-terminated elastomeric polymer (i.e., an elastomeric polyol). This elastomeric component can include acrylic-modified polybutadiene, a saturated polybutadiene and/or a flexible polyurethane. In one aspect, a methacrylated polybutadiene can be provided. The elastomeric material can be provided in amounts of about 0% to about 20% when used in the adhesive. In one aspect, the elastomeric material is provided in amounts of about 5% to about 15%. Satisfactory adhesives can be made with the desired low tack, resealable properties as described herein without the elastomer component; however, it is believed that the elastomeric component aids in achieving an optimal coating performance. The optimal adhesive performance can be defined by properties such as self-adhesion, tack, viscosity, and cure rate, just to name a few. The elastomeric component is useful for adjusting peel strength properties, substrate adhesion strength, increasing flexibility, viscosity control, and cure rate modulation.

To achieve the balanced peel, tack, and bond to the package substrate as described herein, it was determined that the amounts of the three adhesive components need to fall within a specific adhesive component ratio (i.e., ACR) of the acrylate oligomer relative to the elastomeric and tack components. Preferably, the ACR for the adhesive is:

$$\frac{(\text{Wt \% of acrylate oligomer})}{(\text{Wt \% of elastomeric material} + \text{Wt \% of tack control agent})} = 0.5 \text{ to } 1.5.$$

In a another approach, the ACR can be in the range of about 0.8 to about 1.5.

The range for the ACR of the three components in the formulation has been found to provide a unique adhesive formulation with the low tack property to non-like substances (i.e., machine components, crumbs, particulate, food pieces, and the like), yet can seal to itself with sufficient bond or peel strength to maintain a seal therebetween as well as resist contamination. The adhesive in this specific ACR also provides for a resealable function that does not significantly reduce or lose its seal-peel-reseal qualities upon being subjected to repeated open and close operations. An ACR value below about 0.5 is generally undesired because the adhesive would require significantly large amounts of UV energy to cure. If the ACR is above about 1.5, the adhesive would cure quickly, but it would also have low (or no) peel strength, unacceptable for the adhesive closure herein. In addition to the desired range of the ACR, a satisfactory adhesive formulation in some cases may also have certain other parameters such as mixture-stability of the components, a certain viscosity of the formulation, a certain cure rate, and/or a certain peel strength.

Not only is the ACR of the adhesive components desired, but the adhesive components must also be compatible with each other such that they form a stable flowable liquid mixture. As used herein, the adhesive is considered stable when it (at a minimum the two or three main components) remains a homogeneous liquid, i.e., there is no visible phase separation of the components and no gel formation, while being held at room temperature (about 70° F.-75° F.) for up to three days.

In addition, the adhesive formulation can have a viscosity in the range of about 10,000 to about 50,000 centipoise (cPs) or less when at room temperature, or about 2000 cPs or less at about 160° F. (71° C.) and in some cases about 200 cPs or less at 160° F. (71° C.). This viscosity range provides for applying the adhesive to a film substrate using conventional printing, roll coating, or slot-die application techniques.

To produce a sufficiently cured adhesive layer on the substrate, the adhesive can be cured using UV light sources capable of delivering energy in the range of about 100 mJ/cm$^2$ to about 800 mJ/cm$^2$. This in turn helps to ensure that the adhesive has sufficiently cured as determined by an MEK rub resistance test value (ASTM D5402-06) of about 100 double rubs or more (to be discussed in further detail herein).

The average initial peel strength of a properly cured adhesive can be in the range of about 200 gpli to about 900 gpli and, in particular, about 280 gpli to about 800 gpli, as measured by ASTM D3330/D3330M-04 method F. The adhesive is also designed to retain its average peel after repeated open and close operations (i.e., adhesion retention). Preferably, the cured adhesive can retain its average initial peel adhesion between about 280 gpli and about 800 gpli up to at least five repeated peel-reseal cycles. Preferably, the adhesion retention value upon peeling-resealing-peeling can be between about 30% to about 200% retention of the initial value. Upon contaminating the adhesive with debris, such as crackers, the adhesion retention value can be between about 30% to about 150% of the initial value.

An exemplary cracker or crumb contamination test comprised the following steps: first, Triscuit® crackers are obtained and crushed using a bottom of a glass jar. The breaking of the crackers in this fashion creates small particles. Next, a 2 inch diameter ring fixture was placed onto the adhesive of the sample to be tested. Approximately 5 grams of crumbs were placed into the ring on the sample. The sample and ring were gently agitated back and forth to settle the crumbs onto the adhesive surface of the reclosable fastener. The ring was removed from the sample and the crumbs were gently shaken off of the sample and disposed. The ring was replaced back on the substrate in its original position and the area exposed to the crumbs was visually rated for the quantity of crumbs retained. A visual rating scale of zero to 100 was used, where zero meant no visible retained crumbs and 100 meant the total surface was covered with adhering crumbs. After contamination, the adhesive is resealed and the adhesive bonding force is compared to the un-contaminated adhesive bonding force.

By some approaches, a UV photoinitiator can also be added to the adhesive to aid in initiating the curing process. The photoinitiator can be present in amounts of about 0.1% to about 5%. In one aspect, a photoinitiator can comprise a blend of benzophenone derivatives and a synergist compound. A synergist compound is a compound that interacts with the excited benzophenone molecules to form free radicals by electron transfer and hydrogen abstraction. One example is a mixture comprising trimethylbenzoyldiphenylphosphine oxide, α-hydroxyketones and benzophenone derivatives, where the synergist compound includes the first two compounds listed. In another aspect, a photoinitiator can comprise onium salts or other acidic materials activated by UV light. The binder can be comprised of cationically reactive materials such as epoxides, vinyl esters and the like. Optionally, these can also be cross-linked with resins functionalized with carboxylic acid, hydroxyl, or other nucleophilic groups.

Figure 12:
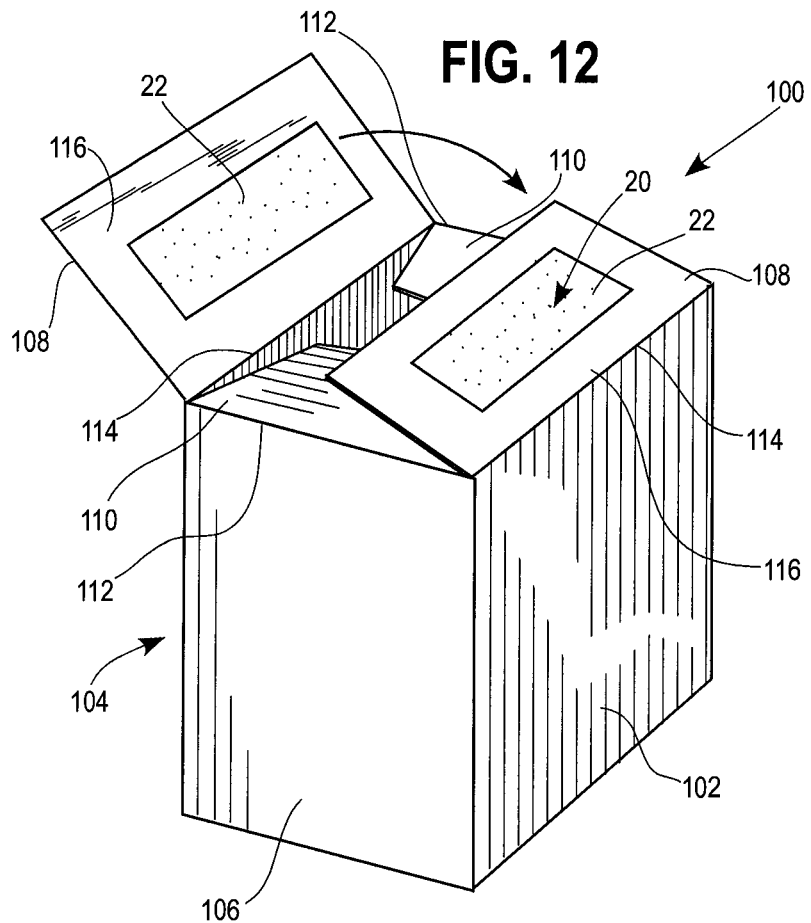
Figure 13:
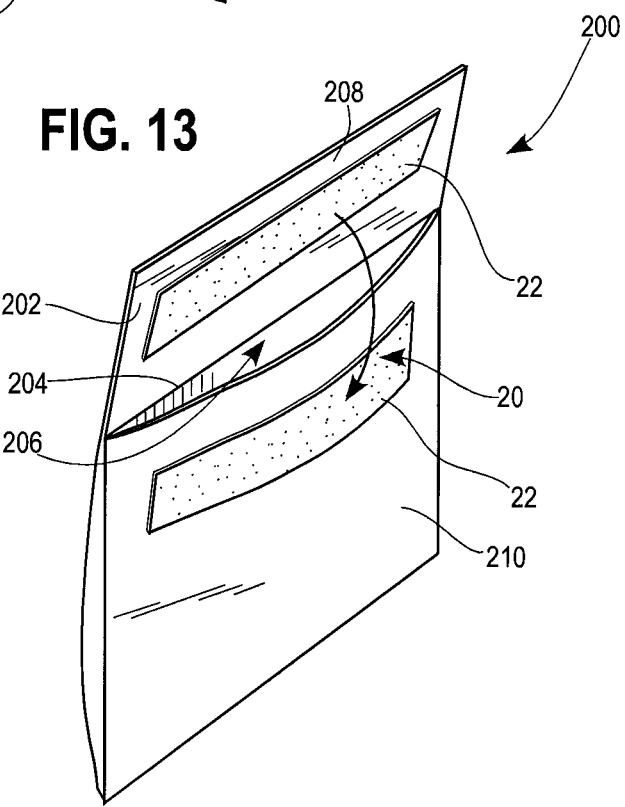

Other exemplary package structures are illustrated in FIGS. 12 and 13. As shown in FIG. 12, a carton 100 in the form of an elongate box with opposing front and rear walls 102 and 104, respectively, and side walls 106 extending between the front and rear walls 102 and 104. With this type of package, an upper end of the carton 100 is open with end flaps 108 extending away from the front and rear walls 102 and 104 and side flaps 110 extending from the side walls 106. One way of closing the open ends of the carton 100 includes first pivoting or folding the side flaps 110 about fold lines 112 and then pivoting or folding the end flaps 108 about the fold lines 114 so that the end flaps are in an overlapping relation. In this application, the adhesive-based fastener 20, and specifically the adhesive portions 22 thereof, as described above, can be disposed on opposing faces 116 of the end flaps 108 to allow the carton 100 to be reclosed so that when the end flaps 108 overlap, the adhesive portions 22 engage or contact each other.

By another approach as shown in FIG. 13, a package 200 in the form of an envelope or sachet using a single hinged flap 202 connected to the body of the envelope by a fold line 204 is shown. In this arrangement, the flap 202 can be pivoted or folded to cover an opening 206 of the envelope. Advantageously, the adhesive-based fastener 20, as described above, can have one of the adhesive portions 22 disposed on an interior face 208 of the flap 202 and the other of the adhesive portions 22 disposed on an outer major surface a body 210 of the package 200. This configuration allows the package 200 to be repeatedly opened and closed by adhering the flap 202 to the package body 210. The fastener 20 may also be used on other types of boxes, cartons, packages, and the like as needed for a particular application.

Figure 14:
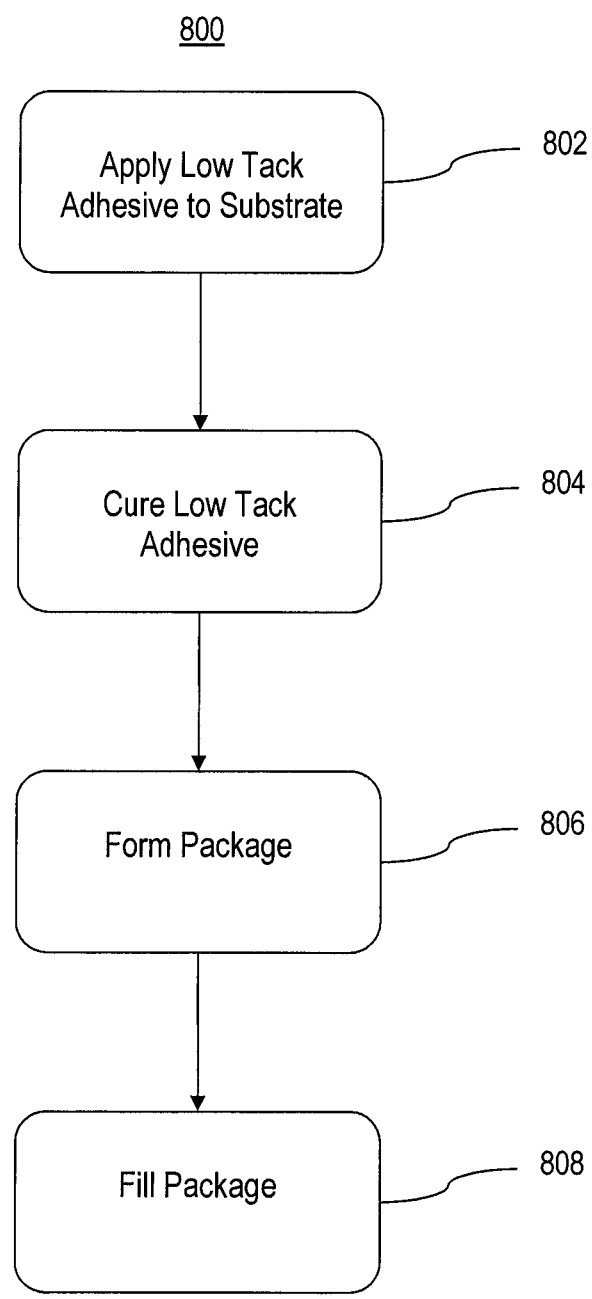
FIGS. 14-15 are exemplary methods of making packages.
Figure 15:
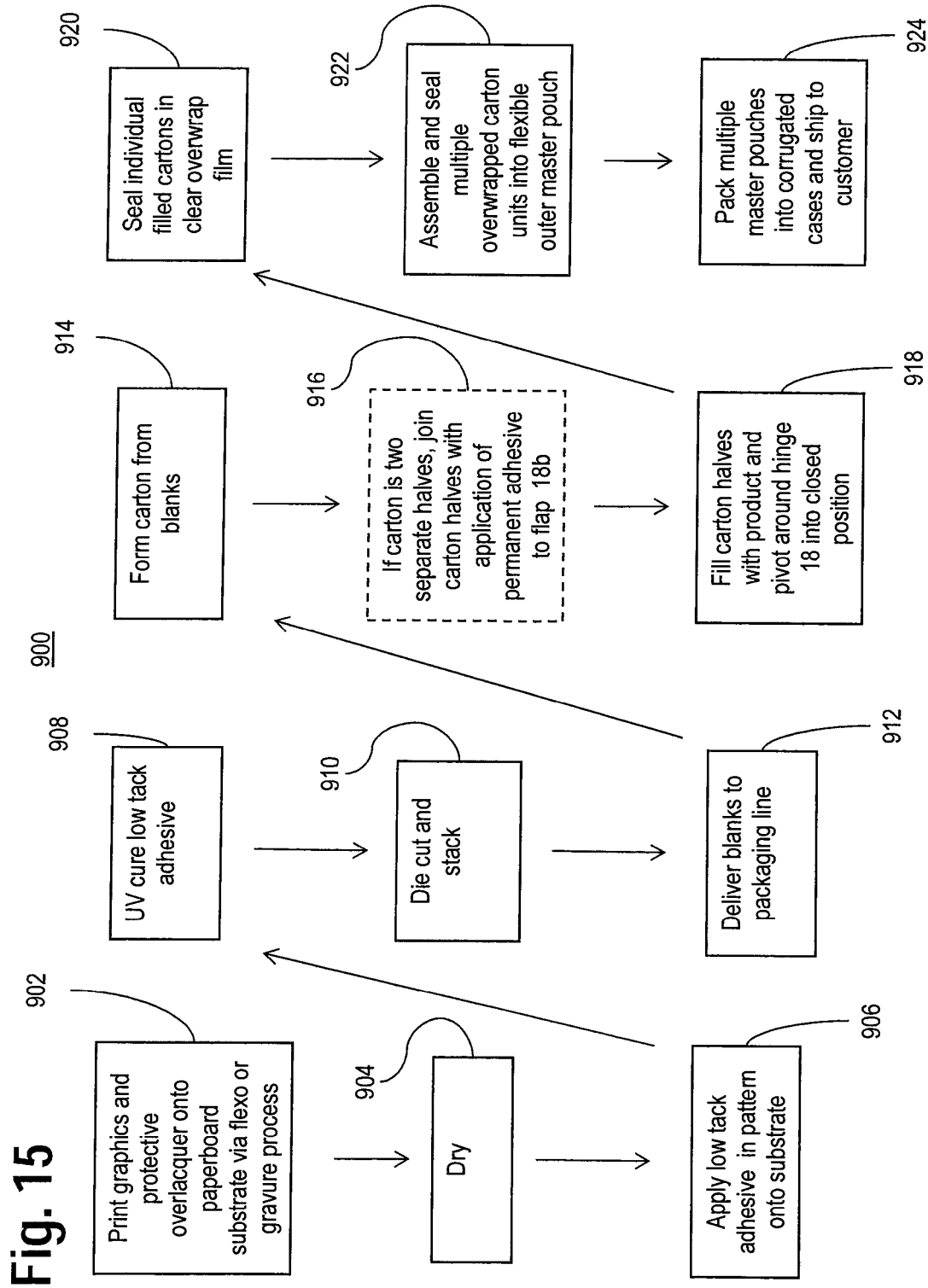

Turning to FIGS. 14 and 15, exemplary methods of forming the package 10 are illustrated. In general, a package 10 can be created in accordance with a method 800 as shown in FIG. 14. By one approach, the low tack adhesive is applied 802 to a package substrate in a suitable pattern. The low tack adhesive is then cured 804. Once the adhesive-based fastener 20 is applied and cured on the package substrate, the package substrate is ready to be formed 806 into the package 10. Once formed, the package 10 can then be filled, such as with food products or the like.

More specifically and as shown in FIG. 15, a package substrate is run through a package formation process 900. First, graphics and/or alphanumeric content may be printed 902 or otherwise disposed on the package substrate. This can also include printing 902 an overlacquer or the like onto the package substrate. The printing can be done via any suitable process, including a flexo process, offset printing, or a gravure process for example. The printing is then allowed to dry 906. If desired, a polymer coating may also be applied to the substrate as well. Next, the low tack adhesive can be applied 906 to the substrate by a suitable process, such as a slot-die coating, a flexo process, or a gravure process. The low tack adhesive is then cured 908. After curing, the package substrate may be cut 910 into one or more blanks or the like by any suitable device, such as one or more dies, rotary dies, lasers, etc., and stacked for future use. When use is desired, the blanks are delivered 912 to the packaging line. Alternatively, the blank can be formed in-line with the packaging line. On the packaging line, the compartments 12, 14 are formed by folding the blanks about the various fold lines, applying permanent adhesive 74 to the front wings 46 of the blank 28, and adhering the front panels 72 to the front wings 46. If applicable for the form of package as shown in FIG. 7, the separate compartments 12, 14 can be adhered 916 together using a permanent adhesive. Once the compartments 12, 14 are created, they can then be filled 918 with one or more of the products 16 and pivoted about the bridge 18 to a closed position as shown in FIG. 3. The filled packages 10 may then be wrapped 920 in a clear overwrap film and assembled and sealed 922 with other wrapped packages in an outer master pouch or package. Multiple outer master pouches or packages are packed 924 into one or more cases and shipped to a customer, retail store, or the like.

Alternatively, the low tack adhesive can be applied to the package at other process locations. For example, the low tack adhesive may be applied after die cutting 910, after forming the carton 914, or after filling 918 as needed for a particular application.

It will be understood that various changes in the details, materials, and arrangements of the package and process of formation thereof, which have been described and illustrated herein in order to explain the nature of the described package, may be made by those skilled in the art with the principle and scope of the embodied package and method as expressed in the appended claims.

What is claimed is:

1. A package comprising:
a first compartment and a second compartment;
a connecting portion between the first and second compartments such that the compartments are configured to be moved between a closed configuration with the first and second compartments adjacent one another and an open configuration with the first and second compartments moved apart; and
a reclosable adhesive-based fastener including opposing portions of adhesive arranged on the first and second compartments so that the opposing portions of adhesive are adhered together when the package is in the closed configuration and configured for repeated peel and reseal bonding to allow repeated opening and closing of the package.

2. The package of claim 1, wherein the first and second compartments are defined by a back wall, a front wall, a bottom wall, and a pair of lateral side walls.

3. The package of claim 2, wherein the opposing portions of adhesive are disposed on major faces of the front walls of the first and second compartments.

4. The package of claim 2, wherein the connecting portion extends between ends of the first and second compartments a distance approximately equal to a width of the pair of lateral side walls of the first and second compartments.

5. The package of claim 2, wherein the connecting portion extends between the back walls of the first and second compartments.

6. The package of claim 2, wherein the front walls of the first and second compartments are partial walls to provide access an interior cavity of the first and second compartments.

7. The package of claim 1, wherein the opposing portions of adhesive are disposed on the first and second compartments in a plurality of discrete portions.

8. The package of claim 1, wherein the first compartment, the second compartment, and the connecting portion have a unitary construction.

9. The package of claim 1, wherein the first compartment, the second compartment, and the connecting portion form a clamshell carton hinged at the connecting portion.

10. The package of claim 1, wherein the adhesive includes a UV-cured pressure sensitive adhesive including at least one UV-curable acrylic oligomer, at least one tack control component, and an optional at least one elastomeric material; and
wherein the UV-cured pressure sensitive adhesive includes an adhesive component ratio (ACR) defined by formula (A) where the weight percent of the UV-curable acrylic oligomer relative to the sum of the weight percents of the tack control component and the optional at least one elastomeric material is about 0.5 to about 1.5

$$\frac{(\text{Wt \% } UV\text{-curable acrylic oligomer})}{(\text{Wt \% tack control component} + \text{Wt \% elastomeric material})}; \quad (A)$$

the ACR such that the UV-cured pressure sensitive adhesive has a first peel adhesion between the opposing portions of adhesive of about 200 grams per linear inch (gpli) to about 900 gpli and up to five subsequent peel adhesions between the opposing portions of adhesive being about 30 percent to about 200 percent of the first peel adhesion.

11. The package of claim 1, wherein a bond strength between the opposing adhesive portions is less than a bond strength between each of the adhesive portions and the first and second compartments respectively.

12. The package of claim 1, wherein at least an outer portion of the first and second compartments include an adhesion promoting filler particles positioned on the compartments to engage the adhesive.

13. The package of claim 1, further comprising a polymer coating on the first and second compartments positioned thereon so that the reclosable adhesive-based fastener is applied to the polymer coating.

14. The package of claim 13, where the polymer coating includes a filler selected from organically modified clay, phillosilicates, calcium carbonate, montmorillonite, dolomite, talc, mica, and mixtures thereof.

15. The package of claim 1, wherein the first and second compartments are constructed from a substrate selected from cardboard, paperboard, laminate, corrugated cardboard, or mixtures thereof.

16. The package of claim 15, wherein the substrate is paperboard and has a polymer layer thereon.

17. The package of claim 16, wherein the substrate is impregnated with a chemical strengthening agent including isocyanates.

18. The package of claim 1, wherein a first peel adhesion between the opposing portions of adhesive is about 200 grams per linear inch (gpli) to about 900 gpli; and a subsequent peel adhesion between the opposing portions of adhesive is about 30 percent to about 200 percent of the first peel adhesion.

19. A blank capable of being folded for forming a folded package, the blank comprising:
a center bridging portion;
first and second end portions connected to opposite sides of the center bridging portion, the first and second end portions configured to be folded into first and second compartments; and
low tack adhesive deposited on each of the first and second end portions and oriented in a manner such that formed first and second compartments can be pivoted closed with the low tack adhesive adhered together.

20. The blank of claim 19, wherein each of the first and second end portions includes a back panel having top, bottom, and side edges, the back panel pivotably connected to the center bridging portion along one edge, side panels pivotably connected to the back panel along the side edges thereof, front wings pivotably connected to edges of the side panels opposite to the back panel, a bottom panel pivotably connected to the back panel along the bottom edge thereof, and a front panel pivotably connected to the bottom panel along an edge thereof opposite to the bottom panel.

21. The blank of claim 19, further comprising permanent adhesive portions disposed on the front wings for forming the first and second compartments.

22. The blank of claim 19, wherein the low tack adhesive includes an adhesive component ratio (ACR) defined by formula (A) where the weight percent of the UV-curable acrylic oligomer relative to the sum of the weight percents of the tack control component and the optional at least one elastomeric material is about 0.5 to about 1.5

$$\frac{(\text{Wt \% }UV\text{-curable acrylic oligomer})}{(\text{Wt \% tack control component} + \text{Wt \% elastomeric material})};\quad (A)$$

the ACR such that the UV-cured pressure sensitive adhesive has a first peel adhesion between the opposing portions of adhesive of about 200 grams per linear inch (gpli) to about 900 gpli and up to five subsequent peel adhesions between the opposing portions of adhesive being about 30 percent to about 200 percent of the first peel adhesion.

\* \* \* \* \*

UNITED STATES PATENT AND TRADEMARK OFFICE
CERTIFICATE OF CORRECTION

| | | |
|---|---|---|
| PATENT NO. | : 8,763,890 B2 | Page 1 of 1 |
| APPLICATION NO. | : 13/035470 | |
| DATED | : July 1, 2014 | |
| INVENTOR(S) | : Kerri Kim Clark et al. | |

It is certified that error appears in the above-identified patent and that said Letters Patent is hereby corrected as shown below:

In The Claims

In claim 14, replace "phillosilicates," with --phyllosilicates,--

Signed and Sealed this
Seventeenth Day of May, 2016

Michelle K. Lee
*Director of the United States Patent and Trademark Office*